(12) United States Patent
Hasegawa

(10) Patent No.: US 8,831,526 B2
(45) Date of Patent: Sep. 9, 2014

(54) MOBILE STATION HAVING MULTIPLE ANTENNAS TO ACCOUNT FOR MOVEMENT BETWEEN TIME OF QUALITY MEASUREMENT AND TIME OF DATA RECEPTION

(75) Inventor: Tsuyoshi Hasegawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1097 days.

(21) Appl. No.: 12/498,602

(22) Filed: Jul. 7, 2009

(65) Prior Publication Data
US 2010/0009636 A1 Jan. 14, 2010

(30) Foreign Application Priority Data
Jul. 8, 2008 (JP) .................. 2008-178245

(51) Int. Cl.
*H04B 17/00* (2006.01)
*H04L 1/00* (2006.01)
*H04L 1/06* (2006.01)

(52) U.S. Cl.
CPC .............. *H04B 17/0042* (2013.01); *H04L 1/06* (2013.01); *H04L 1/0015* (2013.01)
USPC .................... 455/67.11; 455/562.1

(58) Field of Classification Search
USPC ............................. 455/67.11, 522
See application file for complete search history.

(56) References Cited

U.S. PATENT DOCUMENTS

| | | | | |
|---|---|---|---|---|
| 8,243,613 B2 * | 8/2012 | Park et al. | ...................... | 370/252 |
| 2003/0137963 A1 * | 7/2003 | Suenaga et al. | ............... | 370/342 |
| 2003/0204615 A1 * | 10/2003 | Wei et al. | ...................... | 709/232 |
| 2003/0236074 A1 * | 12/2003 | Ishii et al. | ......................... | 455/69 |
| 2005/0128976 A1 * | 6/2005 | Uehara et al. | ................. | 370/329 |
| 2006/0146856 A1 * | 7/2006 | Jung et al. | ..................... | 370/431 |
| 2006/0165091 A1 * | 7/2006 | Arima et al. | ............. | 370/395.21 |
| 2006/0203727 A1 * | 9/2006 | Aizawa et al. | ................ | 370/235 |
| 2007/0004365 A1 * | 1/2007 | Linnartz | ....................... | 455/272 |

(Continued)

FOREIGN PATENT DOCUMENTS

| | | |
|---|---|---|
| EP | 1 887 725 | 2/2008 |
| JP | 2003-198426 | 7/2003 |

(Continued)

OTHER PUBLICATIONS

Notice of Reasons for Refusal dated Jun. 26, 2012, from corresponding Japanese Application No. 2008-178245 with translation.

(Continued)

*Primary Examiner* — Nay A Maung
*Assistant Examiner* — Erica Fleming-Hall
(74) *Attorney, Agent, or Firm* — Katten Muchin Rosenman LLP

(57) ABSTRACT

A mobile station provided with first and second antennas with a distance therebetween includes a reception quality measurement unit that measures, when the mobile station moves in a direction from a location of the first antenna toward a location of the second antenna, a reception quality of a radio signal provided by a base station via the second antenna; a notification unit that notifies the base station of the reception quality measured by the reception quality measurement unit; and a reception processing unit that performs a reception process of a radio signal that is transmitted by the base station, which performs adaptive modulation based on the reception quality notified by the reception unit, and is received by the first antenna.

15 Claims, 19 Drawing Sheets

(56) References Cited

U.S. PATENT DOCUMENTS

| | | | |
|---|---|---|---|
| 2007/0066242 A1* | 3/2007 | Yi et al. | 455/69 |
| 2007/0082672 A1* | 4/2007 | Fujioka et al. | 455/436 |
| 2007/0173208 A1* | 7/2007 | Nishio et al. | 455/78 |
| 2007/0265020 A1* | 11/2007 | Cuffaro | 455/456.5 |
| 2007/0291720 A1* | 12/2007 | Lee | 370/338 |
| 2008/0004064 A1* | 1/2008 | Sakurai et al. | 455/522 |
| 2008/0032726 A1* | 2/2008 | Tajima et al. | 455/509 |
| 2008/0037450 A1* | 2/2008 | Itoh et al. | 370/278 |
| 2008/0125129 A1* | 5/2008 | Lee | 455/440 |
| 2008/0130512 A1* | 6/2008 | Park et al. | 370/252 |
| 2008/0132173 A1* | 6/2008 | Sung et al. | 455/67.13 |
| 2008/0192682 A1* | 8/2008 | Matsumoto et al. | 370/328 |
| 2008/0259893 A1* | 10/2008 | Murata et al. | 370/342 |
| 2009/0170500 A1* | 7/2009 | Terabe et al. | 455/423 |
| 2009/0189813 A1* | 7/2009 | Haas et al. | 342/384 |
| 2010/0014500 A1* | 1/2010 | Lee et al. | 370/342 |
| 2010/0093287 A1* | 4/2010 | Higuchi et al. | 455/67.13 |
| 2010/0165894 A1* | 7/2010 | Furuskar et al. | 370/281 |
| 2010/0310005 A1* | 12/2010 | Takagi et al. | 375/295 |

FOREIGN PATENT DOCUMENTS

| | | |
|---|---|---|
| JP | 2006-345429 | 12/2006 |
| JP | 2007-150906 | 6/2007 |
| JP | 2008-85419 | 4/2008 |
| JP | 2008-085419 | 4/2008 |

OTHER PUBLICATIONS

European Search Report dated Nov. 6, 2009, from the corresponding European Application.

* cited by examiner

US 8,831,526 B2

MOBILE STATION HAVING MULTIPLE ANTENNAS TO ACCOUNT FOR MOVEMENT BETWEEN TIME OF QUALITY MEASUREMENT AND TIME OF DATA RECEPTION

CROSS-REFERENCE TO RELATED APPLICATIONS

This application is based upon and claims the benefit of priority of the prior Japanese Patent Application No. 2008-178245, filed on Jul. 8, 2008, the entire contents of which are incorporated herein by reference.

FIELD

The present invention relates to a mobile station, and a base station ready for adaptive modulation.

BACKGROUND

In mobile communications, a short-time variation at the reception level called fading (refer to FIG. 18) is known to occur. With recent mobile communications, the technology of adaptive modulation has been widely used for overcoming any degradation of properties in a fading environment. Adaptive modulation is a technique for changing the transmission format in accordance with the reception level at the reception end. Selecting an appropriate transmission format at various points in time will enable communications of a satisfactory level even in the fading environment.

A device at the transmission end performs such adaptive modulation using the quality of reception at the reception end. A device at the reception end sends information about the measured reception quality, i.e., CQI (Channel Quality Indicator), to the transmission end, and the device at the transmission end determines the transmission format based on the information about the sent reception quality (refer to FIG. 19).

However, in a high-speed fading environment, the reception quality varies between the time of measurement and the time of reception. As a result, the adaptive modulation may not work effectively, thereby possibly causing degradation of properties. In FIG. 18, the CQI is measured by an antenna 11 provided on a communications device mounted in a vehicle 1. The resulting CQI is transmitted to a base station 2. In response thereto, the base station 2 returns, to the vehicle 1, data in the transmission format corresponding to the provided CQI. The problem here is that when such data is provided to the vehicle 1, the vehicle 1 is already at a different location. If moving at a high speed, the vehicle 1 moves further before it is provided with the data, and thus the level of the reception quality of the antenna 11 may be different from the level at the time of transmitting the CQI. It is thus highly likely that the transmission format of the data provided by the base station 2 is not suitable for the present reception quality.

For such reasons, when AMC (Adaptive Modulation and Coding) being a part of the adaptive modulation is performed with HSDPA (High Speed Downlink Packet Access), for example, in an environment of 120 km/h (VA 120), the maximum throughput is known to fall about 15% compared to an environment of 30 km/h (VA 30). In the near future, for the purpose of increasing the communications speed, the frequency of radio waves used in communications is expected to be increased, and thus the degradation of properties is likely to be accelerated even more in the high-speed fading environment.

SUMMARY

An object of the invention is to provide a mobile station or a base station ready for a change of the wireless environment caused by the movement of the mobile station.

According to an aspect of the invention, a mobile station provided with first and second antennas with a distance therebetween includes a reception quality measurement unit that measures, when the mobile station moves in a direction from a location of the first antenna toward a location of the second antenna, a reception quality of a radio signal provided by a base station via the second antenna; a notification unit that notifies the base station of the reception quality measured by the reception quality measurement unit; and a reception processing unit that performs a reception process on a radio signal that is transmitted by the base station, which performs adaptive modulation based on the reception quality notified by the reception unit, and is received via the first antenna.

According to an aspect of the invention, a base station includes a reception unit that receives a notification of a reception quality from a mobile station, which includes first and second antennas with a distance therebetween and moves in a direction from a location of the first antenna toward a location of the second antenna, the reception quality being measured by the mobile station for a radio signal that is transmitted by the base station and received by the mobile station via the second antenna; an adaptive modulation control unit that performs adaptive modulation control on a transmitting signal based on the reception quality; and a transmission unit that transmits the transmitting signal in accordance with the adaptive modulation control to allow reception thereof by the mobile station via the first antenna.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

DESCRIPTION OF THE PREFERRED EMBODIMENTS

By referring to the accompanying drawings, embodiments for carrying out the invention are described below in detail.

In an aspect of an embodiment, a mobile station is provided with first and second antennas with a distance therebetween. The mobile station is provided with a reception quality measurement unit, a notification unit, and a reception processing unit. The reception quality measurement unit measures, when the mobile station moves in a direction from the location of the first antenna toward the location of the second antenna, the reception quality of a radio signal provided by a base station via the second antenna. The notification unit notifies the base station of the reception quality being a measurement result of the reception quality measurement unit. The reception processing unit performs a reception process on the radio signal received via the first antenna after being provided by the base station that performs adaptive modulation control based on the reception quality notified by the notification unit.

In an aspect of the invention, the second antenna is disposed a predetermined distance away from the first antenna that receives data in the traveling direction, and the reception quality of the second antenna is notified to the base station with some delay in accordance with the time needed for the mobile station to move the distance between the first and second antennas. Such a configuration favorably allows the elimination of possible differences of the levels of the reception quality between the time of measurement of the reception quality and the time of reception of the data during adaptive modulation, improving the throughput.

First Embodiment

Figure 1:
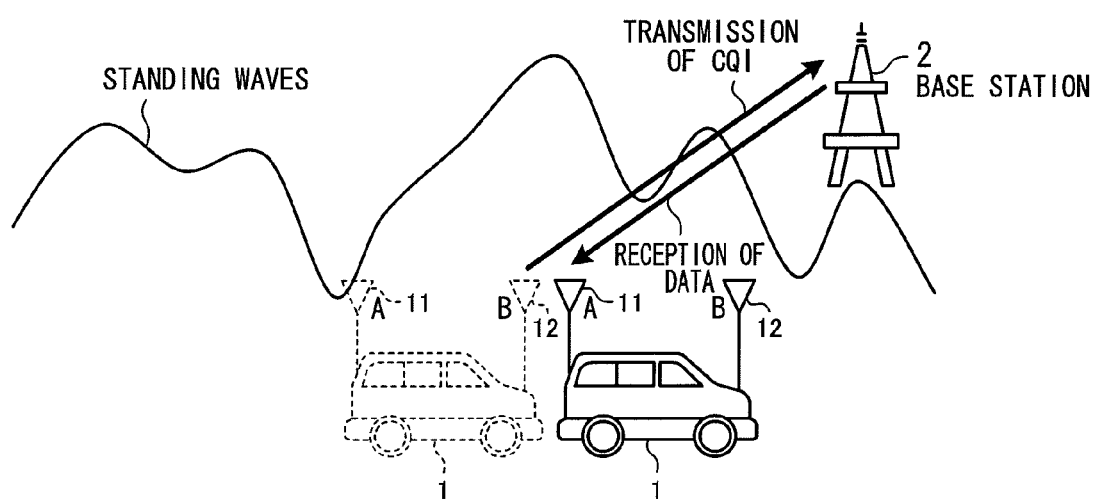
FIG. 1 is a diagram explaining an adaptive modulation method of a first embodiment.

Described now is a method for adaptive modulation of a first embodiment. Herein, components that are the same as ones described in the background section are provided with the same reference numerals. FIG. 1 is a diagram explaining an adaptive modulation method. As illustrated in FIG. 1, in the adaptive modulation method of this embodiment, a communications device mounted in the vehicle 1 is provided with an antenna 12 in addition to the antenna 11. The antenna 12 is located a certain distance away from the location of the antenna 11 in the traveling direction of the vehicle 1.

The fading is mainly caused by standing waves in space. As such, the reception quality measured by the antenna 12 will be at or close to the level of the reception quality to be measured when the antenna 11 reaches the location of the antenna 12.

In consideration thereof, in the adaptive modulation method of this embodiment, the timing of transmitting information about the reception quality is adjusted as to find a location match between where the reception quality of the antenna 12 is measured, and where the antenna 11 is provided with data in a transmission format determined based on the reception quality of the antenna 12. By adjusting the timing of transmitting the information about the reception quality as such, the antenna 11 is always able to receive data in a transmission format adapted to the reception quality, thereby being able to increase the throughput even when the vehicle 1 is moving at a high speed.

Figure 2:
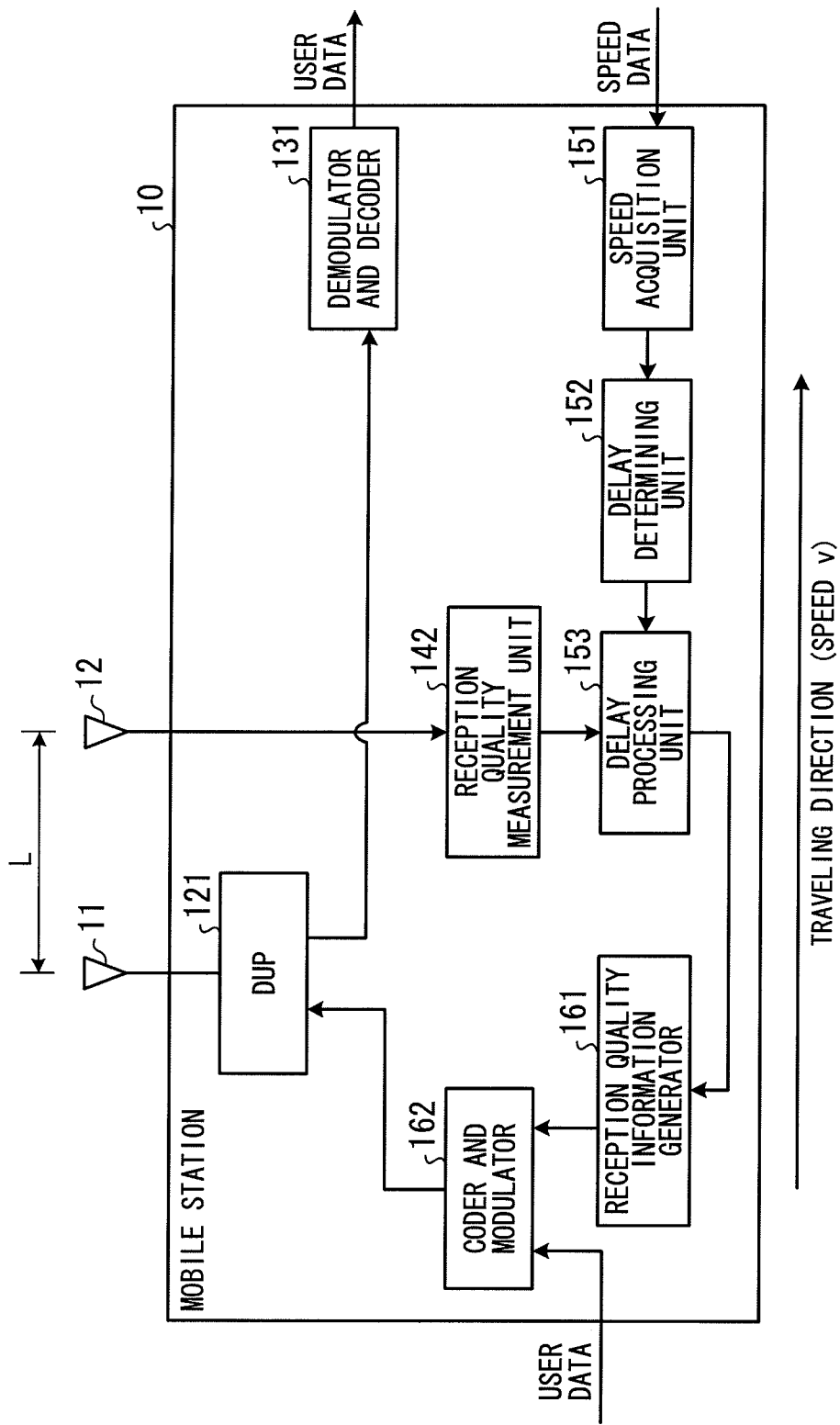
FIG. 2 is an example of a configuration of a mobile station of the first embodiment.

Described next are the configurations of a mobile station 10 and of the base station 2, which are devices for implementing the adaptive modulation method of the first embodiment. FIG. 2 is an example of a configuration of the mobile station 10. As illustrated in FIG. 2, the mobile station 10 is configured to include the antenna 11, the antenna 12, a duplicator (hereinafter, referred to as "DUP") 121, a demodulator and decoder 131, a reception quality measurement unit 142, a speed acquisition unit 151, a delay determining unit 152, a delay processing unit 153, a reception quality information generator 161, and a coder and modulator 162.

The antennas 11 and 12 are both used for transmission and reception of radio waves for radio communications use. The antenna 12 is disposed at a location away from the location of the antenna 11 by a distance L in the traveling direction of the mobile station 10. The DUP 121 accepts an input of a signal coming from the antenna 11, and outputs the signal received by the antenna 11. The demodulator and decoder 131 subjects the signal provided by the DUP 121 to processes of demodulation and decoding, thereby reproducing user data for output. Herein, the processes of demodulation and decoding to be performed by the demodulator and decoder 131 as such may be executed differently depending on the transmission format, which is determined based on the signal provided by the DUP 121.

The reception quality measurement unit 142 is provided to measure the reception quality of the radio waves received by the antenna 12. The reception quality may be expressed as an SIR (Signal-to-Interference Ratio) value, for example. The speed acquisition unit 151 acquires the speed of the mobile station 10 moving in the traveling direction. The moving speed may be acquired based on the rotation frequency of the tires or other methods while the mobile station 10 is mounted in the vehicle, for example.

The delay determining unit 152 determines a delay amount to adjust the timing of notifying the base station 2 of the reception quality measured by the reception quality measurement unit 142. The delay amount T is calculated by the following equation 1, where the distance between the antennas 11 and 12 is "L", the speed acquired by the speed acquisition unit 151 is "v", and the time until data in any corresponding transmission format arrives after information about the reception quality is transmitted to the base station 2 is "D":

$$T=|L/v|-D \quad \text{Equation 1}$$

Assuming that the distance between the antennas is 10 cm and the moving speed is 30 km/h, the time for the mobile station 10 to move 10 cm is calculated as $$0.1/30000 \times 3600 = 0.012 \text{ s} = 12 \text{ ms}.$$

Assuming that radio communications is carried out with HSDPA, the delay amount T will be 2 ms because the time until the data in the corresponding transmission format arrives after the information about the reception quality is transmitted to the base station 2 is 10 ms.

In this example, if the measurement result measured by the reception quality measurement unit 142, i.e., the quality of the radio waves received by the antenna 12, is transmitted to the base station 2 with a delay of 2 ms, the transmission format of the data received by the antenna 11 will be the transmission format best suited for the reception quality. Note that the faster moving speed "v" and the longer distance "L", the transmission format of the data to be received by the antenna 11 will more likely be adapted to the reception quality, thereby allowing improvement of the throughput. As an example, when the distance "L" is 1 m, even if the moving speed "v" is 300 km/h, the throughput may be improved with a delay amount T of 2 ms.

The delay processing unit 153 delays the timing of outputting, to the reception quality information generator 161, the reception quality measured by the reception quality measurement unit 142 with a delay amount determined by the delay determining unit 152. Using the reception quality provided as such, the reception quality information generator 161 generates information about the reception quality being used to notify the base station 2 of the reception quality. For example, the reception quality information generator 161 generates information about the reception quality by converting the SIR value into a CQI using a conversion table or the like made in advance.

The reception quality information generator 161 includes, in the information about the reception quality, a value indicating that the notifying reception quality is accurate. In general, the base station is often set to select the transmission format adapted to a reception quality lower than the notified reception quality. This is due to the assumption that, in the high-speed fading environment, the actual reception quality is lower than the reception quality notified by a wireless communications terminal. With the value included in the information about the reception quality indicating that the reception quality is accurate, the base station is able to select a transmission format adapted to the notified reception quality, thereby being able to improve the throughput.

The coder and modulator 162 subjects user data and information about the reception quality generated by the delay processing unit 153 to the processes of coding and modulation, and outputs the result to the DUP 121 for transmission from the antenna 11.

In the configuration of FIG. 2, the delay processing unit 153 delays the output from the reception quality measurement unit 142. However, the delay processing unit 153 may delay the output from the reception quality information generator 161.

Figure 3:
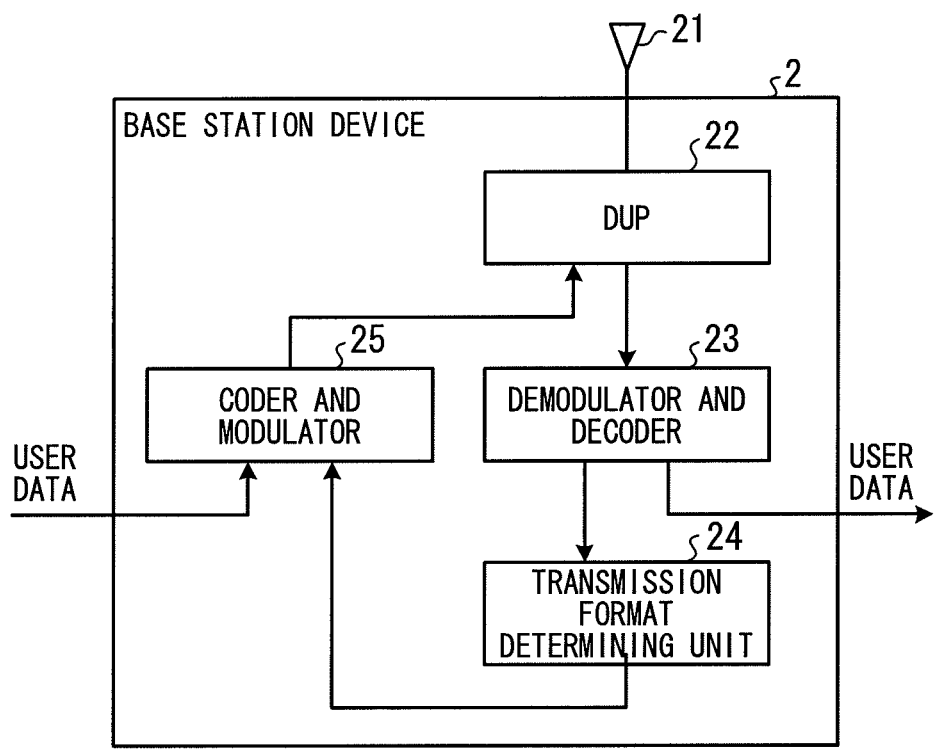
FIG. 3 is an example of a configuration of a base station.

FIG. 3 is a function block diagram illustrating the configuration of the base station 2. In FIG. 3, the base station 2 is configured to include an antenna 21, a DUP 22, a demodulator and decoder 23, a transmission format determining unit 24, and a coder and modulator 25.

The antenna 21 is used for transmission and reception of radio waves for use with radio communications. The DUP 22 accepts an input of a signal coming from the antenna 21, and outputs the signal received by the antenna 21. The demodulator and decoder 23 subjects the signal provided by the DUP 22 to the processes of demodulation and decoding, thereby reproducing user data, information about the reception quality, and the like for output.

The transmission format determining unit 24 determines the transmission format based on the reception quality information provided by the demodulator and decoder 23. The transmission format determining unit 24 makes a selection of the transmission format depending on whether or not the reception quality information includes the value indicating that the reception quality is accurate. If the reception quality information includes no value indicating that the reception quality is accurate, the transmission format determining unit 24 selects a transmission format considered the most suitable for the reception quality that is lower than the notified reception quality by a certain value. On the other hand, when the reception quality information includes a value indicating that the reception quality is accurate, the transmission format determining unit 24 selects a transmission format the most suitable for the notified reception quality.

The coder and modulator 25 subjects the user data and the like to the processes of coding and modulation in accordance with the transmission format determined by the transmission format determining unit 24. The result is then forwarded to the DUP 22 for transmission from the antenna 21.

As described in the foregoing, in this embodiment, the antenna 12 is disposed at a location a predetermined distance away from the antenna 11 for use of data reception in the traveling direction, and the reception quality of the antenna 12 is forwarded to the base station 2 with a delay amount in accordance with the distance between the antennas, the moving speed of the mobile station 10, and the like. With such a configuration, even if the mobile station 10 is moving at a high speed, the data to be received by the antenna 11 can be optimized in terms of the transmission format, thereby improving the throughput.

Second Embodiment

Exemplified in the first embodiment is the case of using the two antennas, and using three or more antennas will increase the throughput to a further extent. In consideration thereof, in a second embodiment, an example of using three antennas for adaptive modulation is described. Components in the second embodiment provided with the same reference numerals as in the first embodiment shall not be described again.

Figure 4:
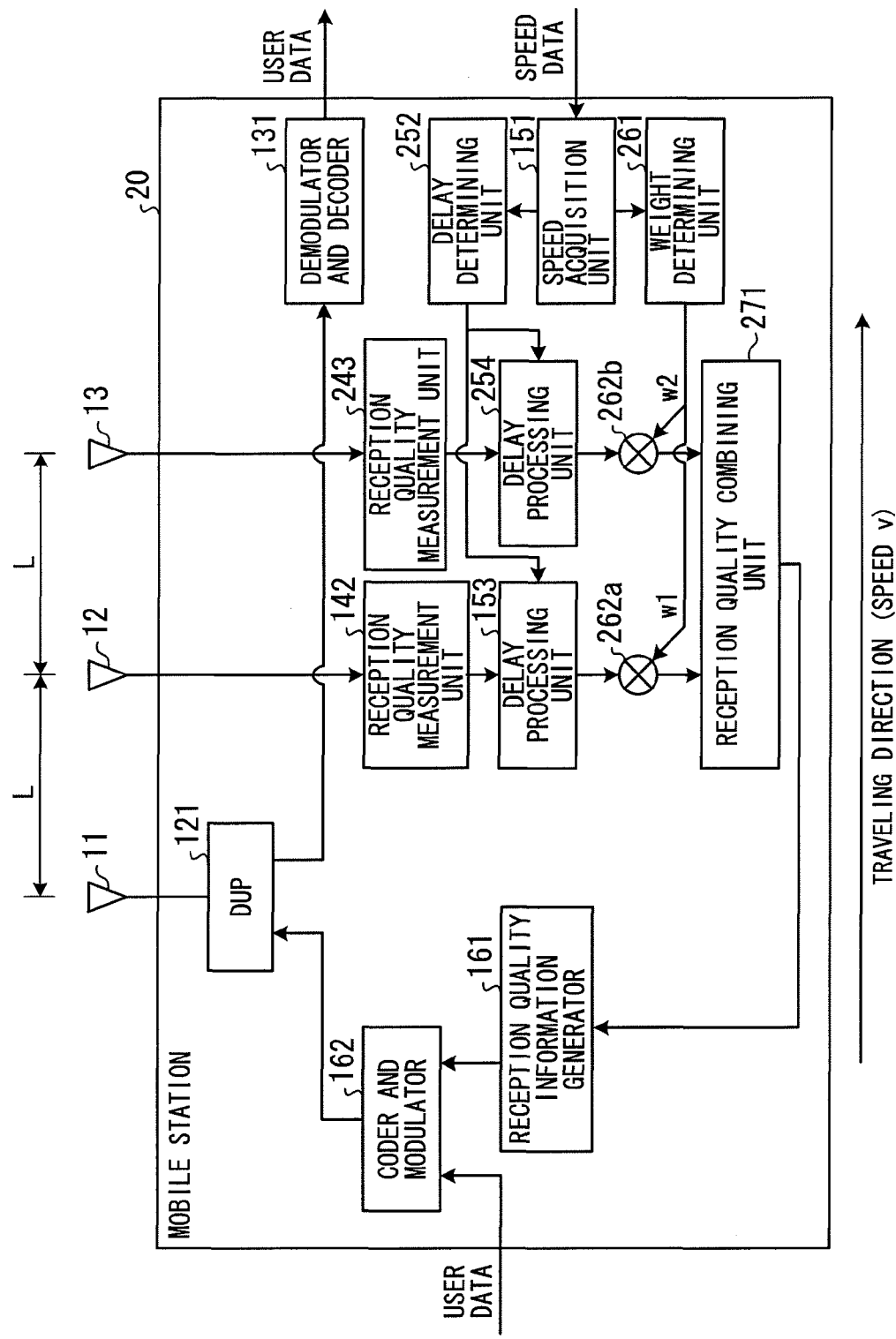
FIG. 4 is an example of a configuration of a mobile station of a second embodiment.

FIG. 4 is an example of a configuration of a mobile station 20 of the second embodiment. As illustrated in FIG. 4, the mobile station 20 is configured to include the antennas 11 and 12, an antenna 13, the DUP 121, the demodulator and decoder 131, the reception quality measurement unit 141, a reception quality measurement unit 243, the speed acquisition unit 151, a delay determining unit 252, the delay processing unit 153, a delay processing unit 254, a weight determining unit 261, calculators 262a and 262b, a reception quality combining unit 271, the reception quality information generator 161, and the coder and modulator 162.

The antenna 13 is used for the transmission and reception of radio waves for use with radio communications, and is disposed at a location away from the location of the antenna 12 by the distance L in the traveling direction of the mobile station 20. The reception quality measurement unit 243 is a device similar to the reception quality measurement unit 142, and is operated to measure the reception quality of the radio waves received by the antenna 13.

The delay determining unit 252 determines a delay amount to adjust the timing of notifying the base station 2 of the reception quality measured by each of the reception quality measurement units 142 and 243. To be specific, as to the reception quality measured by the reception quality measurement unit 142, similar to the first embodiment, the delay determining unit 252 delays the timing of notifying the reception quality by a delay amount calculated with the equation 1. As to the reception quality measured by the reception quality measurement unit 243, the delay determining unit 252 delays the timing of notifying the reception quality by a delay amount T' calculated with the following equation 2.

$$T' = |L \times 2/v| - D \qquad \text{Equation 2}$$

The reason of multiplying the distance L by 2 is because the distance between the antennas 11 and 13 is twice as long as the distance L. Accordingly, when the distance between the antennas 11 and 13 is 1.5 times longer than the distance L, the distance L is multiplied by the value of 1.5 in the equation 2. The delay processing unit 254 delays, for output, the reception quality measured by the reception quality measurement unit 243 by a delay amount determined by the delay determining unit 252.

The weight determining unit 261 determines weights w1 and w2 in accordance with the speed acquired by the speed acquisition unit 151. The weight w1 is the weight to be multiplied by the reception quality provided by the delay processing unit 153, and the weight w2 is the one to be multiplied by the reception quality provided by the delay processing unit 254. The reception quality of the radio waves received by the antenna 12 is combined together with the reception quality of the radio waves received by the antenna 13, so that the reception quality of the antenna 11 to be measured in the future may be estimated with a higher accuracy compared to using only the reception quality of the radio waves received by the antenna 12.

Herein, if a comparison is made between the reception quality of the radio waves received by the antenna 12 and the reception quality of the radio waves received by the antenna 13, the reception quality of the radio waves received by the antenna 12 may be considered more reliable due to a shorter delay amount. In consideration thereof, the weight determining unit 261 sets larger the weight for multiplication of the reception quality with a shorter delay amount, e.g., w1=0.6, and w2=0.4. Note here that, the faster the moving speed, the likelier the difference of delay amounts will be smaller, and thus the weight determining unit 261 reduces the difference between the weights w1 and w2 with an increase of the moving speed.

The calculator 262a multiplies the reception quality provided by the delay processing unit 153 by the weight w1. The calculator 262b multiplies the reception quality provided by the delay processing unit 254 by the weight w2. The reception quality combining unit 271 combines the output from the calculator 262a with the output from the calculator 262b, and outputs the resulting reception quality to the reception quality information generator 161. Note here that combining the reception quality is not restricted merely to addition, but various other calculation methods may also be used, e.g., calculation of an average value.

As described above, in the second embodiment, the three antennas 11 to 13 are aligned in the traveling direction of the mobile station 20, and the reception quality of the radio waves received by the antenna 12 is combined with the reception quality of the radio waves received by the antenna 13 after weighting thereof with a delay amount in accordance with the respective distances from the antenna 11. Such a configuration can increase the estimation accuracy of the reception quality of the antenna 11, and increase the throughput.

Third Embodiment

Exemplified in the first and second embodiments is the case of using the antennas 12 and 13 only to measure the reception quality, but using the antennas also for data transmission and reception can lead to an increase in the performance of transmission and reception. In consideration thereof, a modified version of the mobile station 10 that performs diversity reception using two antennas shall be described in the third embodiment.

Figure 5:
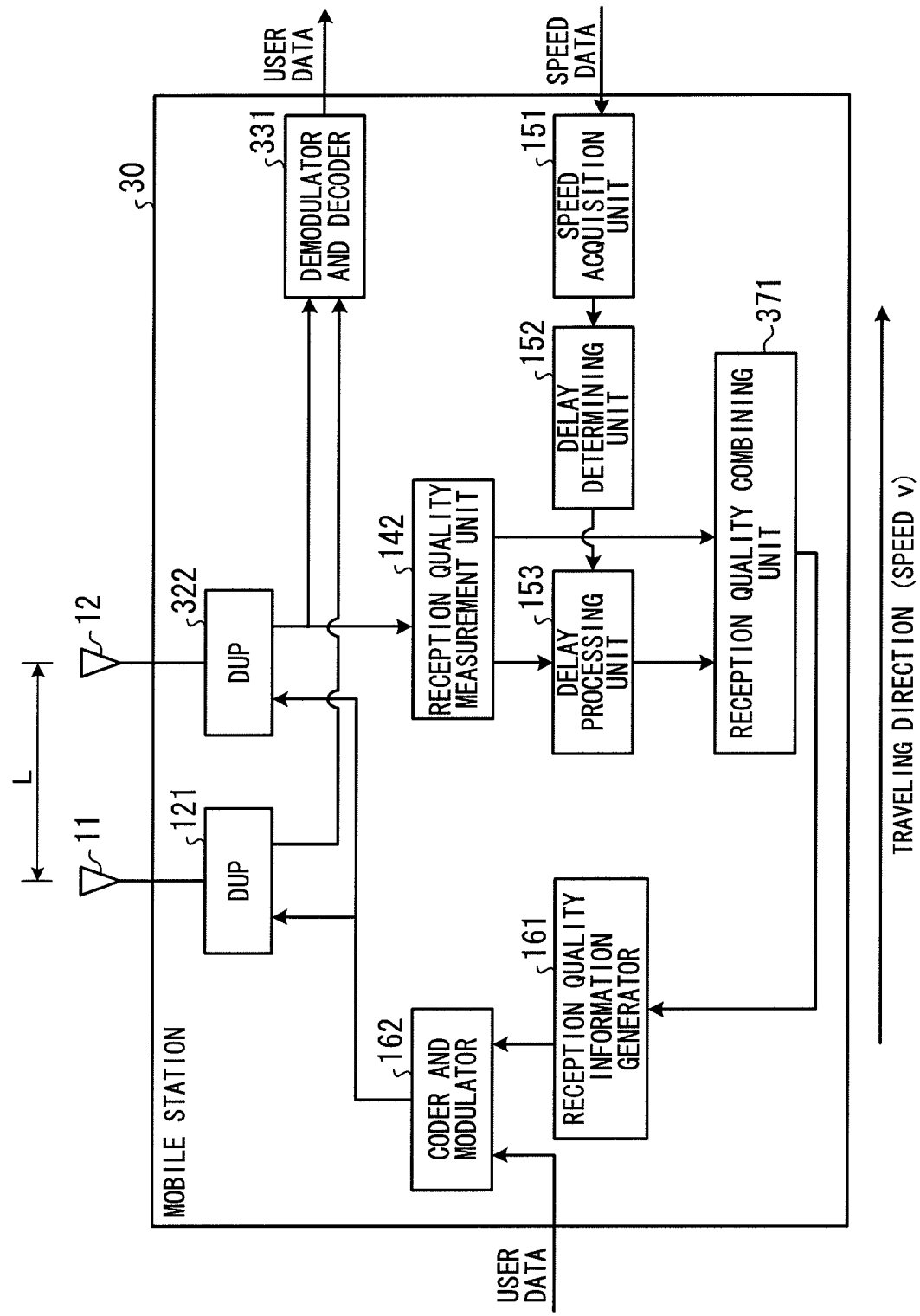
FIG. 5 is an example of a configuration of a mobile station of a third embodiment.

FIG. 5 is an example of a configuration of a mobile station 30 of the third embodiment. As illustrated in FIG. 5, the mobile station 30 is configured to include the antennas 11 and 12, the DUP 121, a DUP 322, a demodulator and decoder 331, the reception quality measurement unit 142, the speed acquisition unit 151, the delay determining unit 152, the delay processing unit 153, a reception quality combining unit 371, the reception quality information generator 161, and the coder and modulator 162.

The DUP 322 receives an input of a signal coming from the antenna 12, and outputs the signal received by the antenna 12. The demodulator and decoder 331 subjects the signal provided by each of the DUPs 121 and 322 to processes of demodulation and decoding, thereby reproducing user data for output. Herein, the processes of demodulation and decoding to be performed by the demodulator and decoder 331 as such are executed differently depending on the transmission format, which is determined based on the signals provided by the DUPs 121 and 322.

The reception quality combining unit 371 combines the reception quality as a result of delaying by the delay processing unit the reception quality measured by the reception quality measurement unit 142 by the delay amount T together with the reception quality with no delay. The combination result is then forwarded to the reception quality information generator 161.

When a plurality of antennas are used to receive the radio waves, the base station is generally notified of the highest value of the measurement results of the reception quality by the respective antennas. However, if increasing the throughput is the purpose of estimating the reception quality at the time of data reception and notifying the base station of the reception quality, the reception quality at the time of data reception by the antenna 11 may be estimated due to the delay process, but the reception quality by the antenna 12 cannot be estimated. Accordingly, in the adaptive modulation method in this embodiment, the base station is notified of the result of combining the reception quality of the antenna 11 together with that of the antenna 12 using the latest value as is.

Alternatively, for a higher estimation accuracy of the reception quality, the reception quality of the antenna 11 may be assigned more weight than the reception quality by the antenna 12 before combination thereof because the antenna 11 is expected to have the higher reception quality in consideration of the delay amount.

Figure 6:
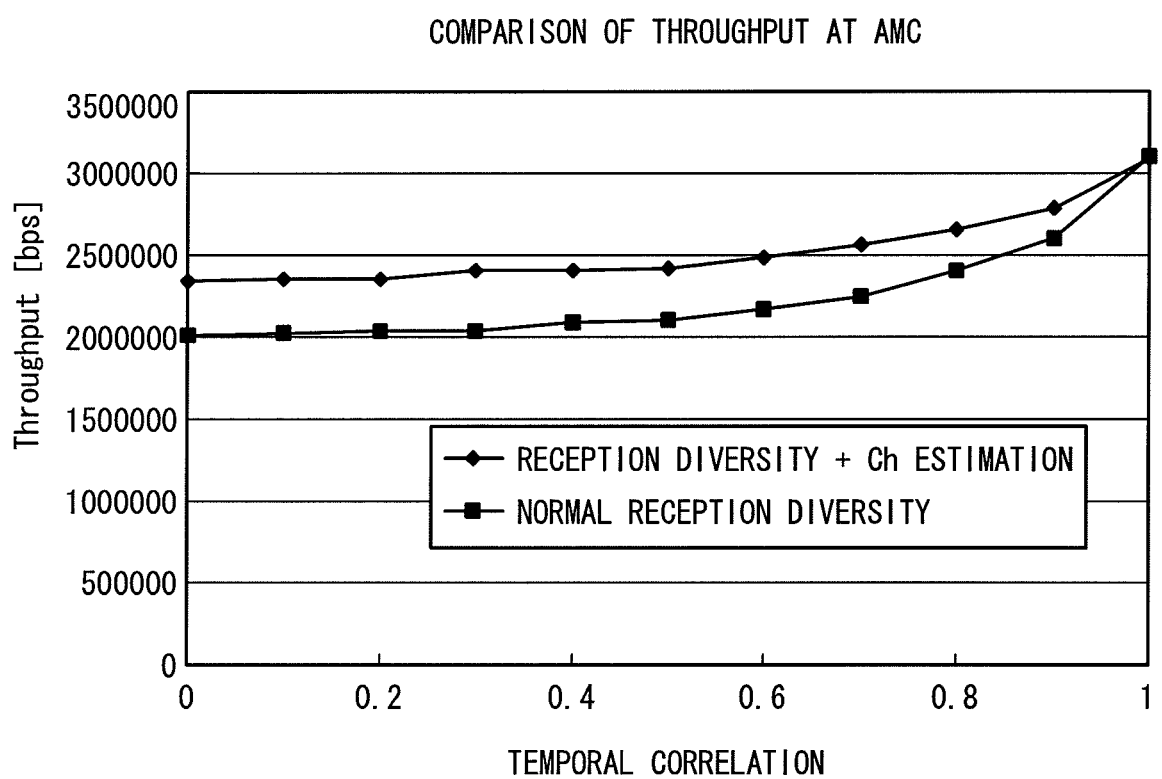
FIG. 6 is a diagram explaining a result of throughput simulation when AMC is performed with HSDPA.

FIG. 6 is a diagram explaining a result of throughput simulation when AMC is performed with HSDPA. The vertical axis in FIG. 6 indicates the throughput, and the horizontal axis indicates the correlation value between the SIR value at the time of measurement of the reception quality and the SIR value at the time of data reception. The correlation value of the horizontal axis takes the value of 1 when the mobile station 30 is not moving, and takes the value of 0 when the mobile station 30 is moving at a very high speed. As can be seen from FIG. 6, the high-speed movement of the mobile station generally causes about 30 percent degradation of properties. However, using the adaptive modulation method of this embodiment leads to an improvement of properties of about 10 percent.

As described above, in the third embodiment, the antenna 12 originally provided for measurement of the reception quality may also be used for data transmission and reception so that the properties of transmission and reception can be favorably improved.

Fourth Embodiment the first to third embodiments are cases in which the traveling direction of the mobile station is limited to one direction. However, when the mobile station is mounted in a rail car, for example, the mobile station may be moved not only in the traveling direction but also in the opposite direction. In consideration thereof, in a fourth embodiment, a modified version of the mobile station 30 which enables optimization of the throughput even when the mobile station 30 is moved in the direction opposite to the traveling direction is described.

Figure 7:
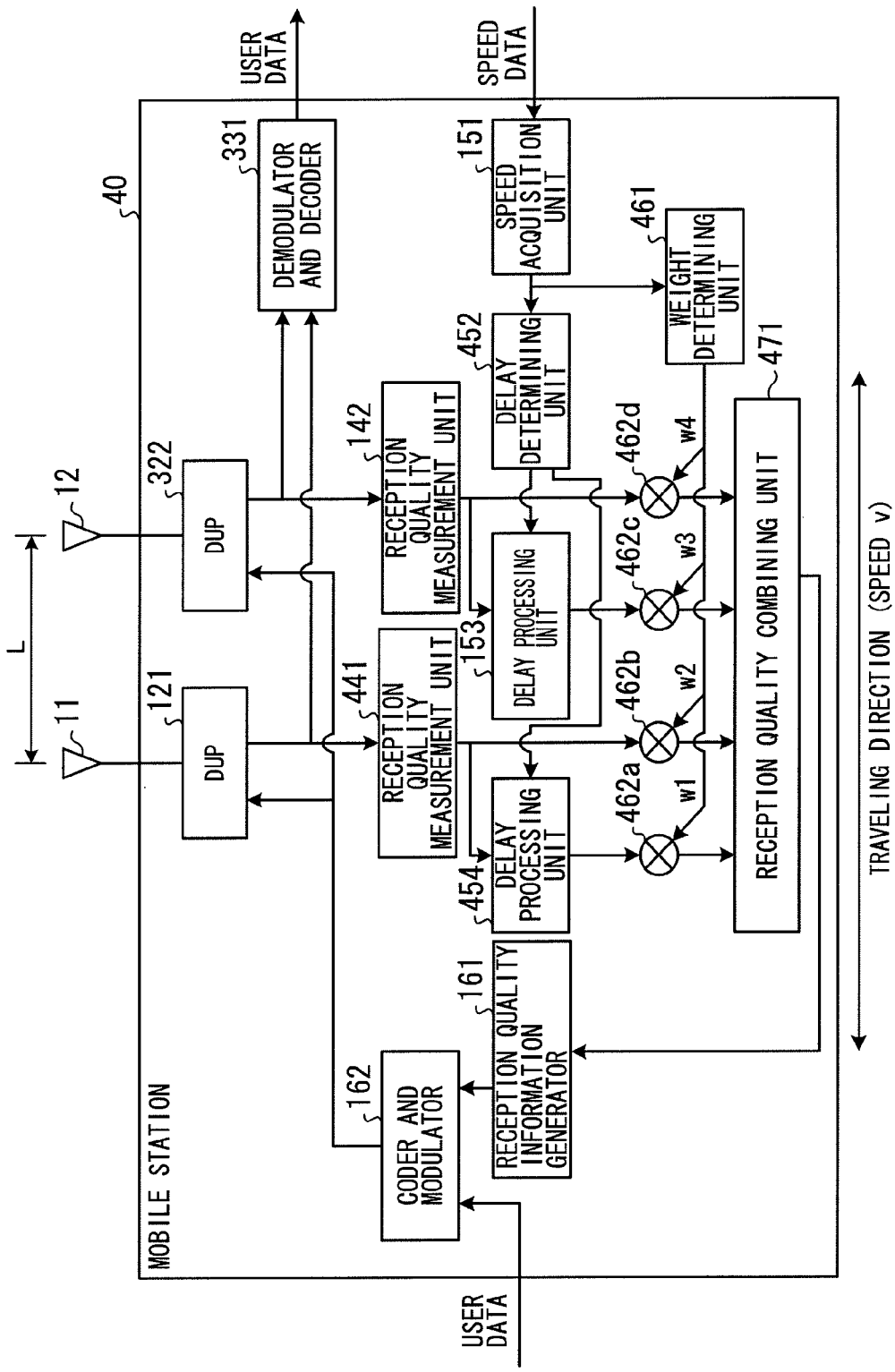
FIG. 7 is an example of a configuration of a mobile station of a fourth embodiment.

FIG. 7 is an example of a configuration of a mobile station 40 of the fourth embodiment. As illustrated in FIG. 7, the mobile station 40 is configured to include the antennas 11 and 12, the DUPs 121 and 322, the demodulator and decoder 331, a reception quality measurement unit 441, the reception quality measurement unit 142, the speed acquisition unit 151, a delay determining unit 452, the delay processing unit 153, a delay processing unit 454, a weight determining unit 461, calculators 462a to 462d, a reception quality combining unit 471, the reception quality information generator 161, and the coder and modulator 162.

The reception quality measurement unit 441 is provided to measure the reception quality of the radio waves received by the antenna 11. The reception quality may be expressed as an SIR value, for example. The delay determining unit 452 determines a delay amount for adjusting the timing of notifying the base station 2 of the reception quality based on the equation 1 described above. The resulting delay amount T is forwarded to both the delay processing units 153 and 454. The delay processing unit 454 forwards the reception quality measured by the reception quality measurement unit 441 with the delay amount determined by the delay determining unit 452.

The weight determining unit 461 determines weights w1 to w4 in accordance with the speed acquired by the speed acquisition unit 151. The weight w1 is the weight to be multiplied by the reception quality with a delay amount provided by the delay processing unit 454, and the weight w2 is the weight to be multiplied by the reception quality measured by the reception quality measurement unit 441 and includes no delay. The weight w3 is the weight to be multiplied by the reception quality measured by the reception quality measurement unit 142, and includes a delay amount provided by the delay processing unit 153. The weight w4 is the weight to be multiplied by the reception quality measured by the reception quality measurement unit 142, and includes no delay.

Assumed here is that the speed acquisition unit 151 acquires a speed of a positive value when the mobile station 40 moves in the direction from the antenna 11 toward the antenna 12, and acquires a speed of a negative value when the mobile station 40 moves in the direction from the antenna 12 toward the antenna 11. In this case, when the speed acquisition unit 151 acquires the speed of a positive value, the weight determining unit 461 determines the weights w1 to w4 as w1=w2=0, and w3=w4=1, for example. With the weights determined as such, the reception quality to be measured in the future will be estimated using only the reception quality of the radio waves received by the antenna 12 disposed on the side in the traveling direction, thereby leading to the same effects as those derived by the configuration of FIG. 5.

On the other hand, when the speed acquisition unit 151 acquires the speed of a negative value, the weight determining unit 461 determines the weights w1 to w4 as w1=w2=1, and w3=w4=0, for example. With the weights determined as such, the reception quality to be measured later will be estimated using only the reception quality of the radio waves received by the antenna 12 disposed on the side in the direction opposite to the traveling direction, thereby leading to the same effects as those derived by the configuration of FIG. 5.

As such, by measuring the reception quality of the radio waves received by each of the antennas, and by changing the weight for the resulting reception quality of each of the antennas in accordance with the direction, i.e., in which direction the mobile station 40 moves, the throughput may also be improved when the mobile station 40 moves in the direction opposite to the traveling direction.

When the moving speed is extremely slow, the delay time will be extremely long. The distribution of the standing waves in space may change and the accuracy of estimation may be reduced. In consideration thereof, the weight determining unit 461 may be so configured as to notify, when the moving speed is slower than a certain threshold value, the base station 2 of the reception quality at that time with the weights of w1=w3=0, and w2=w4=1.

As an alternative configuration of the weight determining unit 461, when the moving speed takes any intermediate threshold value among a plurality of threshold values provided for the moving speed, the weight may be set to be intermediate as w1=0, w2=w3=0.5, and w4=1 for improvement of the properties, for example.

The calculator 462a multiplies the reception quality provided by the delay processing unit 454 by the weight w1. The calculator 462b multiplies the reception quality provided by the reception quality measurement unit 441 by the weight w2. The calculator 462c multiplies the the reception quality provided by the delay processing unit 153 by the weight w3. The calculator 462d multiplies the reception quality provided by the reception quality measurement unit 142 by the weight w4. The reception quality combining unit 471 combines together the outputs from the calculators 462a to 462d, and outputs the resulting reception quality to the reception quality information generator 161.

As described above, in the fourth embodiment, the reception quality of the antenna 11 is measured in addition to that of the antenna 12, and the speed acquired by the speed acquisition unit 151 is used as a basis to change the weight for each of the measurement results. This accordingly allows for an increase of the throughput when the mobile station 40 moves not only in one direction but also in the direction opposite thereto.

Fifth Embodiment

The first to fourth embodiments are cases where the mobile station determines the delay time for notification of the reception quality through acquisition of data related to the moving speed thereof from the outside. Alternatively, the mobile station may be configured to determine the delay time without the supply of data related to the moving speed thereof from the outside. As such, in a fifth embodiment, a modified version of the mobile station 40 that determines the delay time without receiving a supply of data related to the moving speed thereof from the outside is described.

Figure 8:
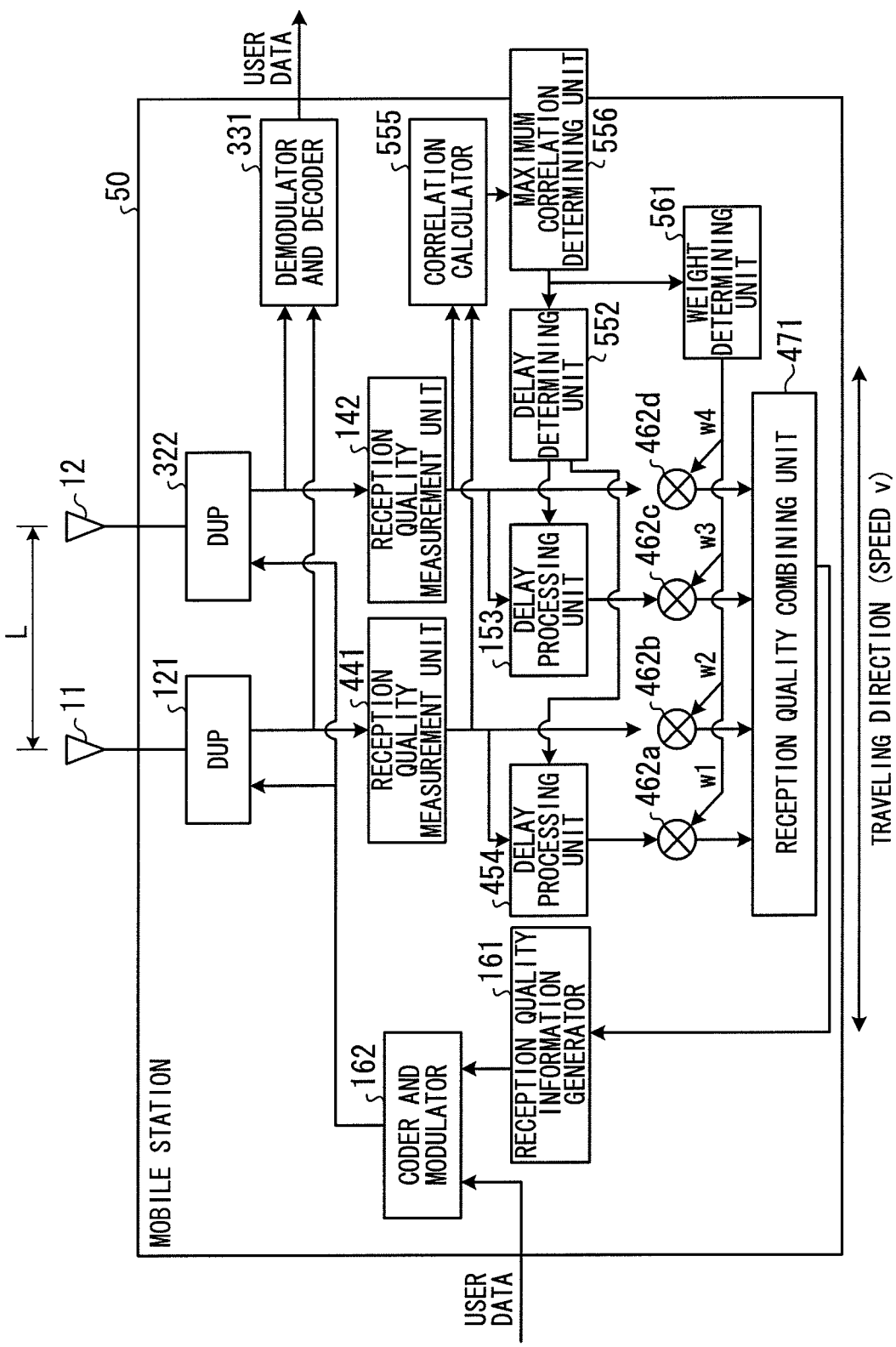
FIG. 8 is an example of a configuration of a mobile station of a fifth embodiment.

FIG. 8 is an example of a configuration of a mobile station 50 of the fifth embodiment. As shown in FIG. 8, the mobile station 50 is configured to include the antennas 11 and 12, the DUPs 121 and 322, the demodulator and decoder 331, the reception quality measurement unit 441, the reception quality measurement unit 142, a correlation calculator 555, a maximum correlation determining unit 556, a delay determining unit 552, the delay processing units 153 and 454, a weight determining unit 561, the calculators 462a to 462d, the reception quality combining unit 471, the reception quality information generator 161, and the coder and modulator 162.

The correlation calculator 555 stores two types of reception quality for a predetermined period of time. The reception quality types include one reception quality type measured by the reception quality measurement unit 441, and one reception quality type measured by the reception quality measurement unit 142. The correalation calculator calculates correlation between waveforms expressing the change, in time, of these two types of reception quality. To be specific, the correlation calculator 555 calculates, in stages, the temporal-change waveform of the correlation between the reception quality measured by the reception quality measurement unit 441 and the reception quality measured by the reception quality measurement unit 142. This calculation of the correlation is performed while the temporal-change waveform of the reception quality measured by the reception quality measurement unit 441 is being shifted in the direction of a time axis in stages of Δt. Such a correlation calculation may be performed in any known manner.

The maximum correlation determining unit 556 makes a comparison among the correlation results derived by the correlation calculator 555 for all of the stages, and acquires the cumulative value of Δt at the stage showing the highest value among the correlation results. The maximum correlation determining unit 556 then forwards the resulting cumulative value of At to the other components such as the delay processing units 153 and 454, and the weight determining unit 561.

Figure 9:
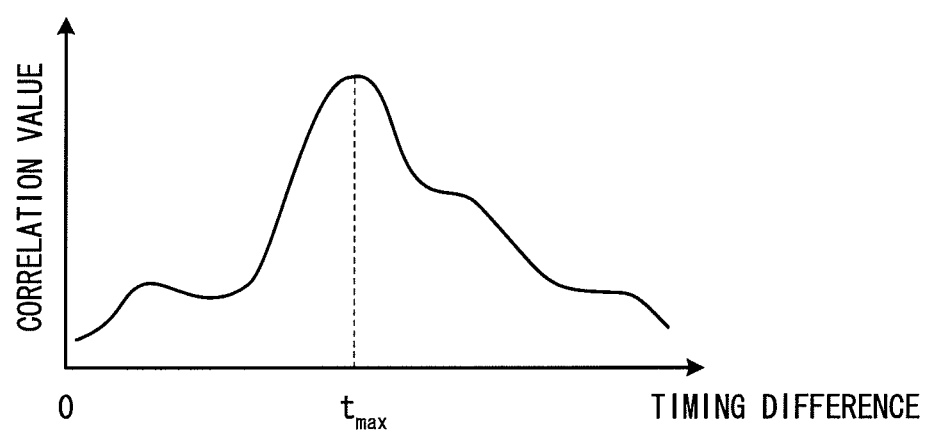
FIG. 9 is a diagram explaining, by a temporal-change waveform, an example of a correlation between the levels of reception quality.

FIG. 9 illustrates an example of a temporal-change waveform of a correlation between levels of reception quality. The timing difference at the stage showing the highest value among the correlation results of FIG. 8, i.e., timing difference tmax, corresponds to the cumulative value of Δt at that stage. Note here that, in the example of FIG. 8, only the correlation corresponding to the timing difference in the positive direction is calculated. However, the correlation corresponding to the timing difference in the negative direction may also be calculated which allows for the calculation when the mobile station 50 moves in the direction opposite to the traveling direction.

The delay determining unit 552 calculates the delay amount T using the following equation 3, where "ΣΔt" indicates the input of a cumulative value of Δt, and "D" indicates the time before data in any corresponding transmission format is provided after the reception quality information is transmitted to the base station 2:

$$T=|\Sigma \Delta t|-D \qquad \text{Equation 3}$$

The delay determining unit 552 then forwards the resulting delay amount T to the other components, such as the delay processing units 153 and 454, and the weight determining unit 561.

As described above, when the mobile station 50 is moving in the direction from the antenna 11 toward the antenna 12, the reception quality of the antenna 12 may almost be the same as that of the antenna 11 after a certain length of time. Accordingly, the waveform derived by shifting the temporal change waveform of the reception quality measured by the reception quality measurement unit 441 and shifted a specific length of time along the time axis is expected to substantially match the temporal change waveform of the reception quality measured by the reception quality measurement unit 142. Based on such a principle, the delay determining unit 552 is able to determine any appropriate delay amount without an input of the moving speed.

The weight determining unit 561 determines the weights w1 to w4 in accordance with the input of a cumulative value of Δt. Assumed here is that the input of cumulative value of Δt is a positive value when the moving station 50 moves in the direction from the antenna 11 toward the antenna 12, and the input of the cumulative value of Δt is a negative value when the moving station 50 moves in the direction from the antenna 12 toward the antenna 11. In this case, when the input is a positive value, the weight determining unit 561 determines the weights w1 to w4 to be w1=w2=0, and w3=w4=1, for example. With the weights determined as such, the reception quality to be measured in the future will be estimated using only the reception quality of the radio waves received by the antenna 12 disposed on the side in the traveling direction, thereby leading to the same effects as those derived by the configuration of FIG. 5.

On the other hand, when the input is a negative value, the weight determining unit 561 determines the weights w1 to w4 to be w1=w2=1, and w3=w4=0, for example. With the weights determined as such, the reception quality to be measured in the future will be estimated using only the reception quality of the radio waves received by the antenna 11 disposed on the side in the direction opposite to the traveling direction, thereby leading to the same effects as those derived by the configuration of FIG. 5.

When the moving speed is extremely slow, the delay time will be extremely long. This may change the distribution of the standing waves in space, and the accuracy of estimation may be reduced. In consideration thereof, the weight determining unit 561 may be configured to notify, when the moving speed is extremely slow, e.g., when the absolute value of the input value is larger than a predetermined threshold value, the base station 2 of the reception quality at that time with the weights of w1=w3=0, and w2=w4=1.

As an alternative configuration of the weight determining unit 561, when the moving speed is determined to be an intermediate threshold value among a plurality of threshold values provided with respect to the input value, the weights may be set to be intermediate as w1=0, w2=w3=0.5, and w4=1 for improvement of the properties.

As described above, in the fifth embodiment, the delay amount is determined based on the correlation between the reception quality of the antenna 11 and that of the antenna 12. This accordingly enables the selection of any optimum delay time without the supply of data related to the moving speed of the mobile station from the outside. Note that, in this embodiment, the correlation of the reception quality is used as such as a basis to determine the delay amount, but alternatively, a pilot signal or the like may be used as a reference to determine the delay amount based on the correlation between the intensity of the radio waves received by the antenna 11 and the intensity of the radio waves received by the antenna 12.

Sixth Embodiment

To achieve effective use of the adaptive modulation method of a sixth embodiment, the distance between the antennas is considered significant. With the configuration of FIG. 1, when the distance L between the antennas is short, the delay amount to be calculated by the equation 1 will be a negative value, thereby failing to optimally adjust the delay time. On the other hand, when the distance L between the antennas is too long, this may cause a large change of the standing waves during the delay of notification of the reception quality. As a result, it is highly likely that the transmission format for the data coming from the base station will not be optimum.

In this sense, the distance L between the antennas is preferably adjusted so that the result of the equation 1, i.e., delay amount T, takes a value as small as possible in the positive range. Accordingly, in the sixth embodiment, a modified version of the mobile station 10 with which the distance L between the antennas is appropriately adjusted in accordance with the moving speed of the mobile station is described.

Figure 10:
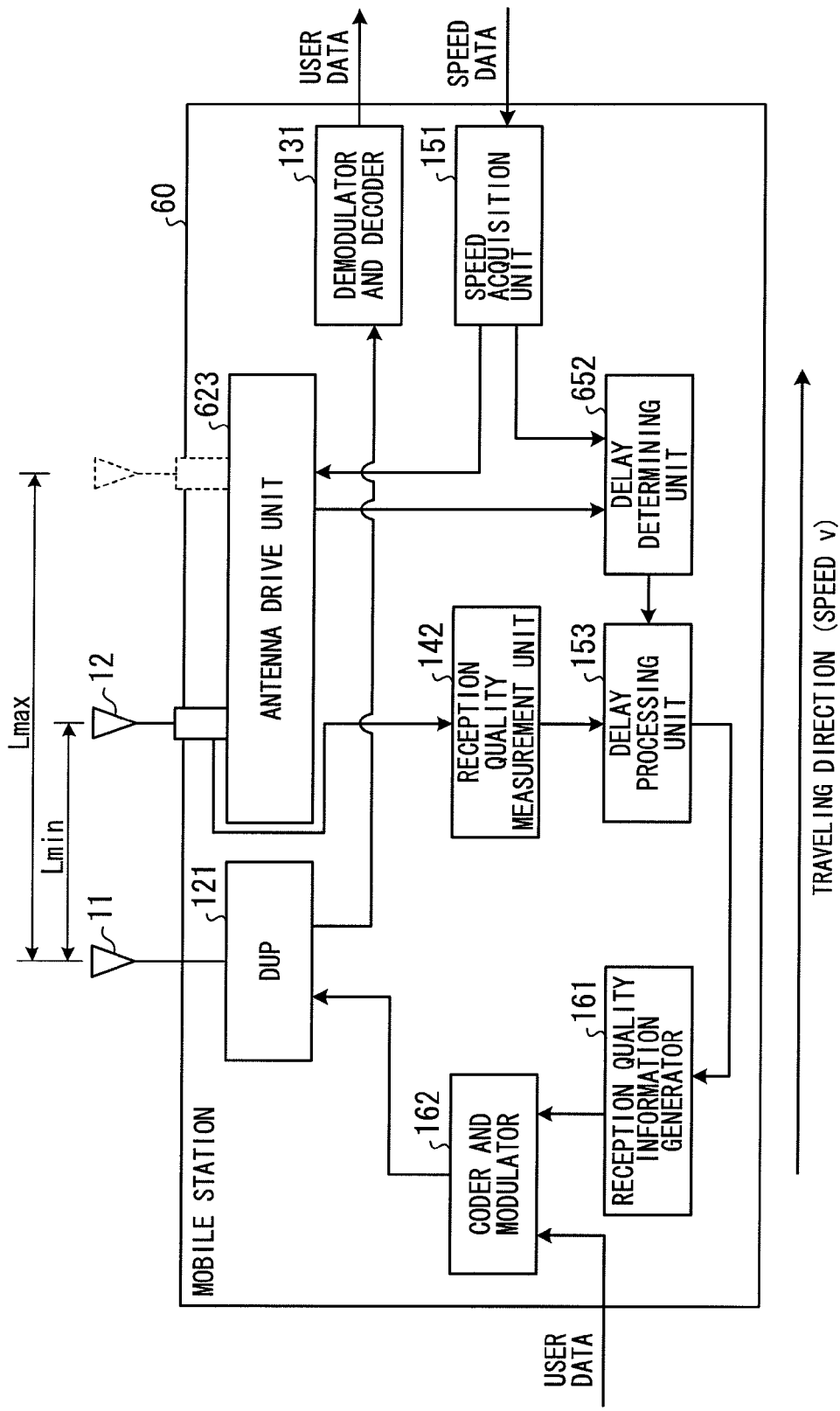
FIG. 10 is an example of a configuration of a mobile station of a sixth embodiment.

FIG. 10 is an example of a configuration of a mobile station 60 of the sixth embodiment. As illustrated in FIG. 10, the mobile station 60 is configured to include the antennas 11 and 12, the DUP 121, an antenna drive unit 623, the demodulator and decoder 131, the reception quality measurement unit 142, the speed acquisition unit 151, a delay determining unit 652, the delay processing unit 153, the reception quality information generator 161, and the coder and modulator 162.

The antenna drive unit 623 moves the antenna 12 forward and backward along the same axis as the traveling direction in accordance with the speed acquired by the speed acquisition unit 151. Specifically, the antenna drive unit 623 controls the antenna 12 by position in such a manner that the delay amount T satisfies $0 \leq T \leq Th$. The delay amount T here derived by the equation 1 above using the speed acquired by the speed acquisition unit 151. Herein, "Th" denotes a sufficiently short length of time with which any influence of a change of the standing waves is negligible. The antenna drive unit 623 notifies the delay determining unit 652 of the distance between the antennas 11 and 12.

The delay determining unit 652 determines the delay amount to adjust the timing of notifying the reception quality to the base station 2 using the equation 1 above, with the speed acquired by the speed acquisition unit 151, and the distance between the antennas notified by the antenna drive unit 623. The resulting delay is forwarded to the delay processing unit 153.

As described above, in the sixth embodiment, the moving speed is used as a basis to adjust the distance between the antennas, optimizing the distance between the antennas and increasing the throughput irrespective of the moving speed. Note that, in this embodiment, the antenna 12 is configured to be movable, but alternatively, the antenna 11, or both the antennas 11 and 12 may be configured to be movable.

Seventh Embodiment

The sixth embodiment is an example of an antenna configured to be movable to keep an optimum the distance between the antennas. Alternatively, a plurality of antennas may be provided to measure the reception quality with varying distances from the antenna used for data reception, and if this is the configuration, effects similar to the above embodiments may be also achieved. In consideration thereof, in the seventh embodiment, a modified version of the mobile station 10 with which a plurality of antennas are provided to measure the reception quality to keep an optimum distance among the antennas is described.

Figure 11:
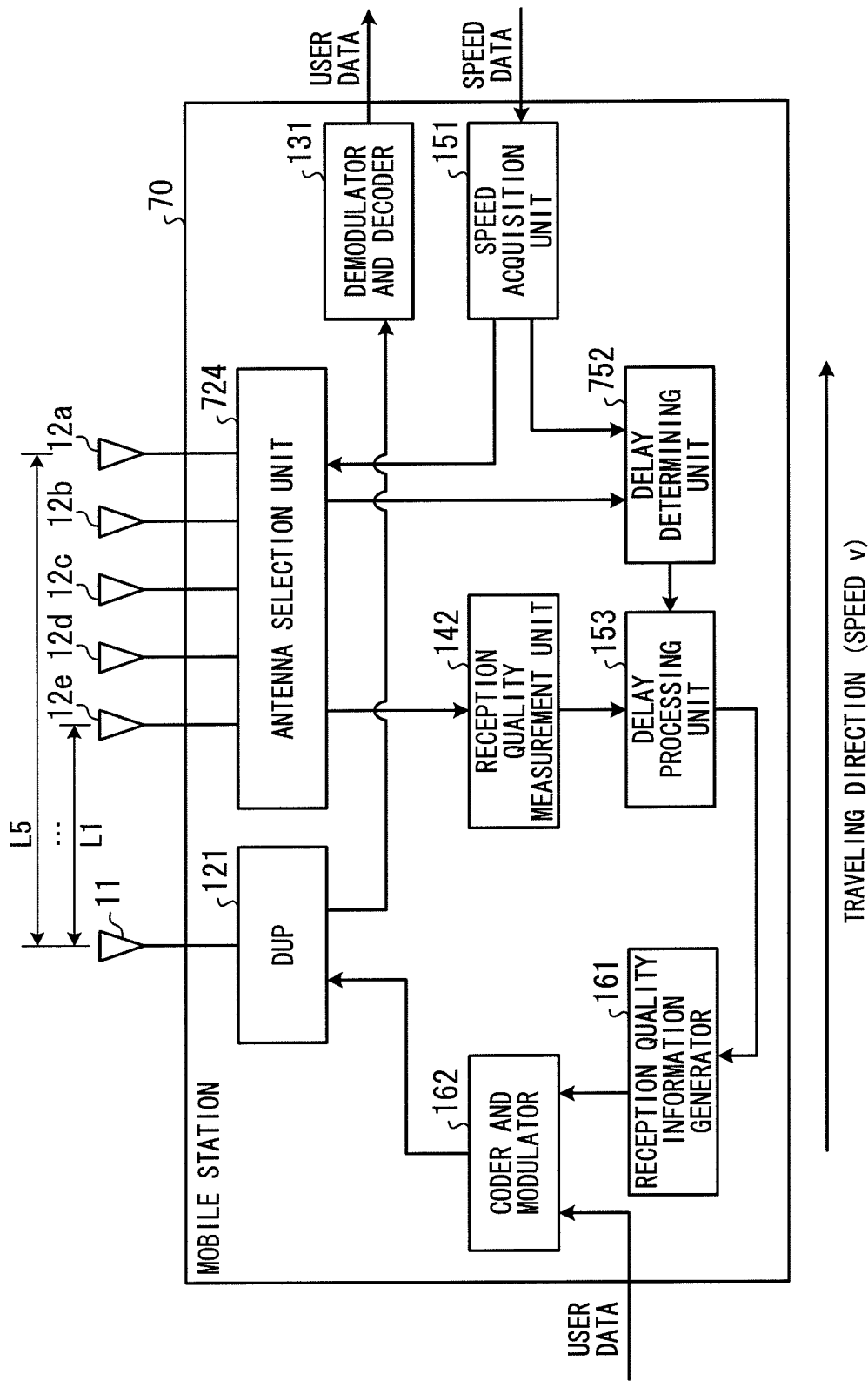
FIG. 11 is an example of a configuration of a mobile station of a seventh embodiment.

FIG. 11 is an example of a configuration of a mobile station 70 of the seventh embodiment. As illustrated in FIG. 11, the mobile station 70 is configured to include the antenna 11, antennas 12a to 12e, the DUP 121, an antenna selection unit 724, the demodulator and decoder 131, the reception quality measurement unit 142, the speed acquisition unit 151, a delay determining unit 752, the delay processing unit 153, the reception quality information generator 161, and the coder and modulator 162.

The antennas 12a to 12e are disposed at locations of various distances away from the location of the antenna 11 in the traveling direction of the mobile station 70.

The antenna selection unit 724 calculates the delay amount L for each of the antennas 12a to 12e using the equation 1 above using the speed acquired by the speed acquisition unit 151 and the distance from the antenna 11. The antenna selection unit 724 selects any of the antennas 12a to 12e whose resulting delay amount T is equal to or larger than 0, and is the smallest among all the antennas 12a to 12e. The antenna selection unit 724 then forwards a signal received by the selected antenna to the reception quality measurement unit 142, and notifies the delay determining unit 752 of the distance between the selected antenna and the antenna 11.

The delay determining unit 752 determines the delay amount to adjust the timing of notifying the reception quality to the base station 2 using the equation 1 above, with the speed acquired by the speed acquisition unit 151, and the distance between the antennas notified by the antenna selection unit 724. The resulting delay amount is forwarded to the delay processing unit 153.

As described above, in the seventh embodiment, a plurality of antennas are provided to measure the reception quality, and an optimum antenna may be selected therefrom in accordance with the moving speed, thereby improving the distance between the antennas and increasing the throughput irrespective of the moving speed of the mobile station.

Eighth Embodiment

To achieve effective use of the adaptive modulation method of an eighth embodiment, it is desirable to place the antennas so that an antenna to measure the reception quality and an antenna used for data reception are both aligned along the traveling direction. However, when a mobile station is fixedly mounted in a vehicle or the like, when the vehicle or the like is making a turn, the direction along which the antennas are disposed deviates from the traveling direction because the traveling direction will be directed inward from the front of the vehicle or the like.

As such, when such a deviation from the traveling direction occurs to the antenna-aligned direction, the reception quality of the antenna disposed on the side of the traveling direction will not always be the same as that to be measured in the future for the remaining antennas disposed therebehind, and the delay amount to be calculated by the equation 1 above may not be optimum, thereby resulting in a possibility of a reduction in the throughput. Accordingly, in the eighth embodiment, a modified version of the mobile station 10 with which the antennas are to be aligned along the traveling direction even when a vehicle or the like is making a turn is described.

Figure 12:
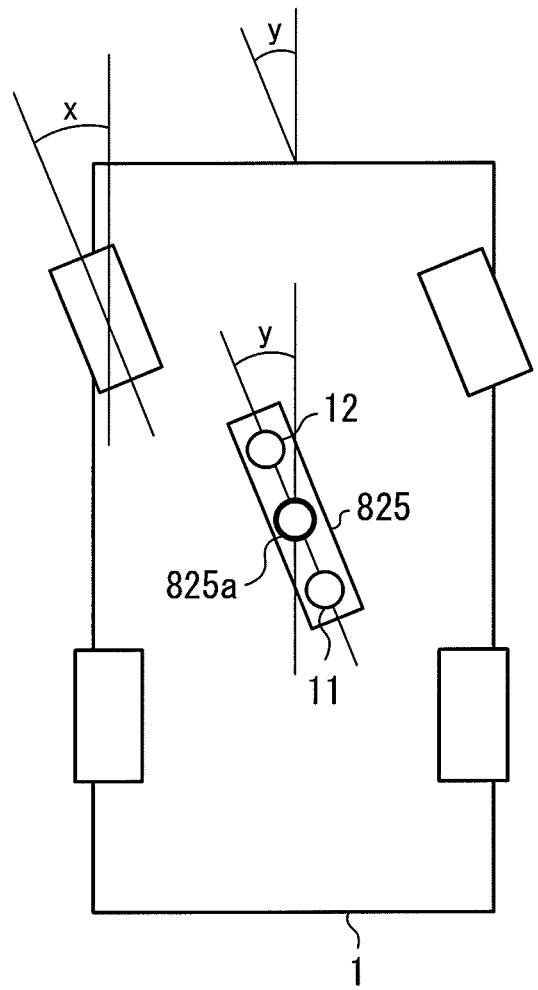
FIG. 12 is a diagram explaining a vehicle mounted with a mobile station of an eighth embodiment during a turn.

FIG. 12 is a diagram explaining the vehicle 1 mounted with a mobile station of the eighth embodiment, during a turn. As illustrated in FIG. 12, in the mobile station 80, the antennas 11 and 12 are both disposed on an antenna rotation unit 825. The antenna rotation unit 825 is configured to be directed freely about an axis 825a, and is operated to align the antennas 11 and 12 along the traveling direction of the vehicle 1.

Assuming that the vehicle 1 is moving in the direction of an angle y with respect to the front side of the vehicle, the antenna rotation unit 825 is rotated to align the antennas 11 and 12 with the angle y with respect to the front side of the vehicle 1. By changing the alignment direction of the antennas 11 and 12 in accordance with the traveling direction of the vehicle 1 as such, the antennas 11 and 12 are always aligned along the traveling direction, thereby favorably increasing the accuracy of the adaptive modulation.

The traveling direction of the vehicle 1 may be acquired through conversion of the direction x of the front wheels of the vehicle 1 or of the steering angle of the vehicle 1, or may be acquired by an acceleration sensor provided on the vehicle 1 or on the mobile station 80.

Figure 13:
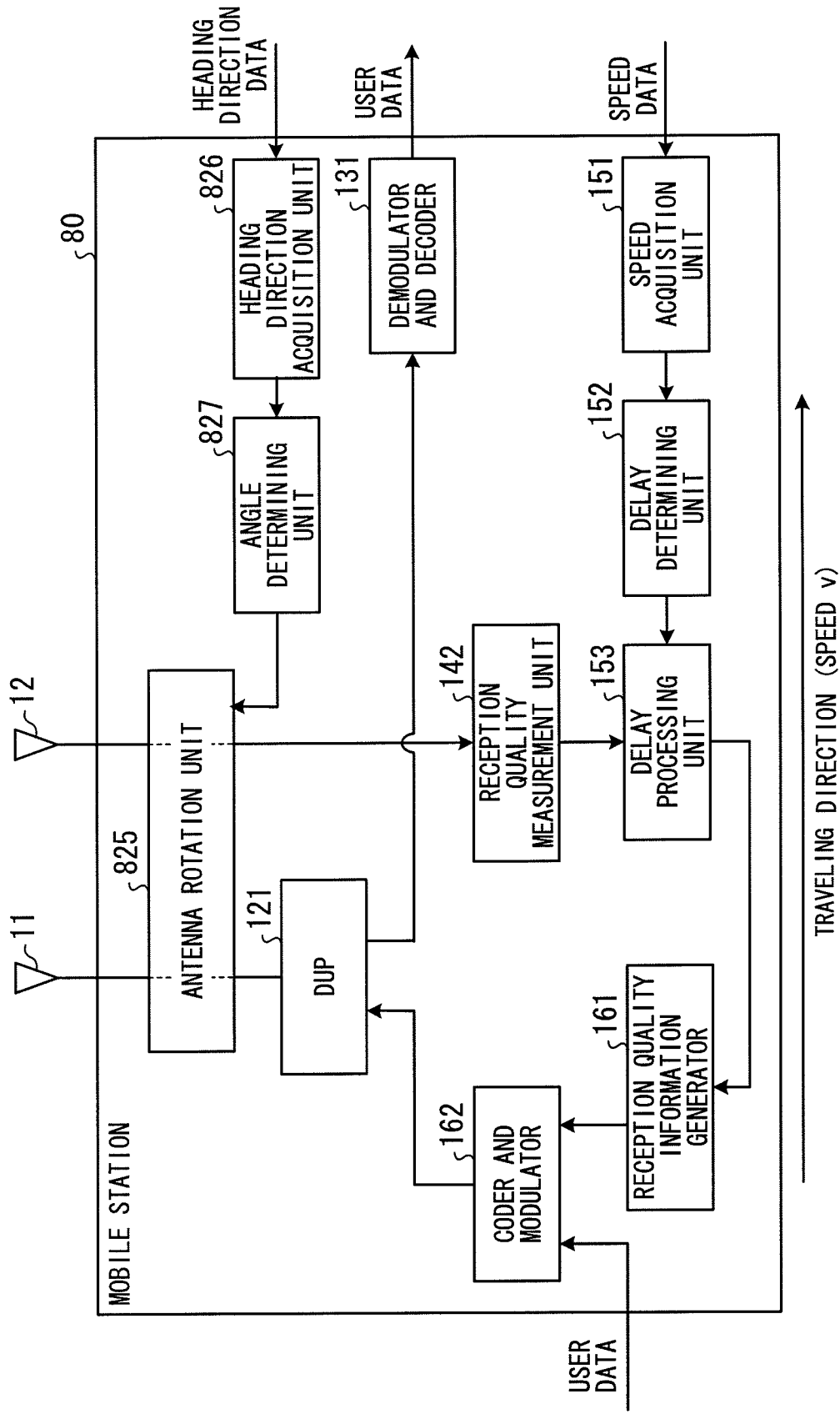
FIG. 13 is an example of a configuration of the mobile station of the eighth embodiment.

FIG. 13 is an example of a configuration of the mobile station 80 of the eighth embodiment. As illustrated in FIG. 13, the mobile station 80 is configured to include the antennas 11 and 12, the antenna rotation unit 825, a traveling direction acquisition unit 826, an angle determining unit 827, the DUP 121, the demodulator and decoder 131, the reception quality measurement unit 142, the speed acquisition unit 151, the delay determining unit 152, the delay processing unit 153, the reception quality information generator 161, and the coder and modulator 162.

The antenna rotation unit 825 changes the alignment direction of the antennas 11 and 12. The traveling direction acquisition unit 826 acquires information indicating the traveling direction of the mobile station 80. Based on the information acquired by the traveling direction acquisition unit 826 as such, the angle determining unit 827 calculates the rotation angle for the antenna rotation unit 825 to align the antennas 11 and 12 along the traveling direction. The resulting angle is forwarded to the antenna rotation unit 825.

As described above, in the eighth embodiment, the antennas 11 and 12 are aligned differently depending on any change of the traveling direction. This accordingly enables the alignment of the antennas 11 and 12 along the traveling direction, and increases the accuracy of the adaptive modulation.

Ninth Embodiment

The eighth embodiment is an example of rotating and moving the antennas to align the antennas always along the traveling direction. Similar effects may also be achieved if a plurality of antennas to measure the reception quality are provided at varying directions from an antenna for use in data reception. In consideration thereof, in a ninth embodiment, a modified version of the mobile station 10 in which a plurality of antennas to measure the reception quality are provided at varying directions from an antenna for use in data reception is described.

Figure 14:
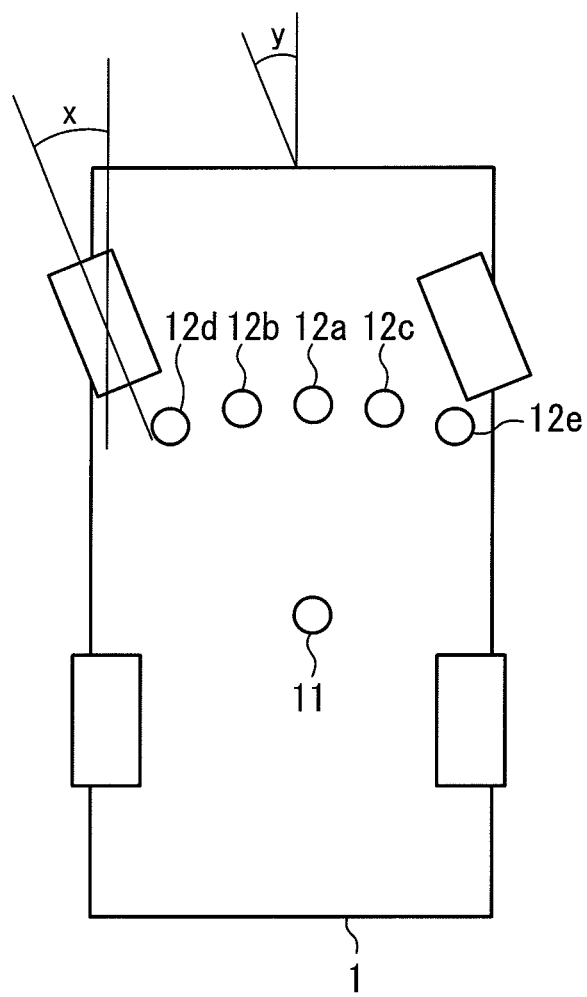
FIG. 14 is a diagram explaining a turning vehicle mounted with a mobile station of a ninth embodiment.

FIG. 14 is a diagram explaining the vehicle 1 mounted with a mobile station 90 of the ninth embodiment during a turn. As illustrated in FIG. 14, in the mobile station 90, the antennas 12a to 12e are disposed a to vary in directions from the antenna 11. Among these antennas 12a to 12e, viewed from the antenna 11, any antenna located closest to the traveling direction of the vehicle 1 is selected, and the reception quality of the selected antenna is used for the adaptive modulation.

Assuming that the vehicle 1 is moving in the direction with an angle of y with respect to the front side of the vehicle, the angle from the antenna 11 to the antenna 12b is the angle closest to the angle y, and so the reception quality of the antenna 12b is used for the adaptive modulation. Alternatively, the antenna 11 direction of the vehicle 1 may be acquired through conversion of the direction x of the front wheels of the vehicle 1 or of the steering angle of the vehicle 1, or may be acquired by an acceleration sensor provided in the vehicle 1 or in the mobile station 90.

Figure 15:
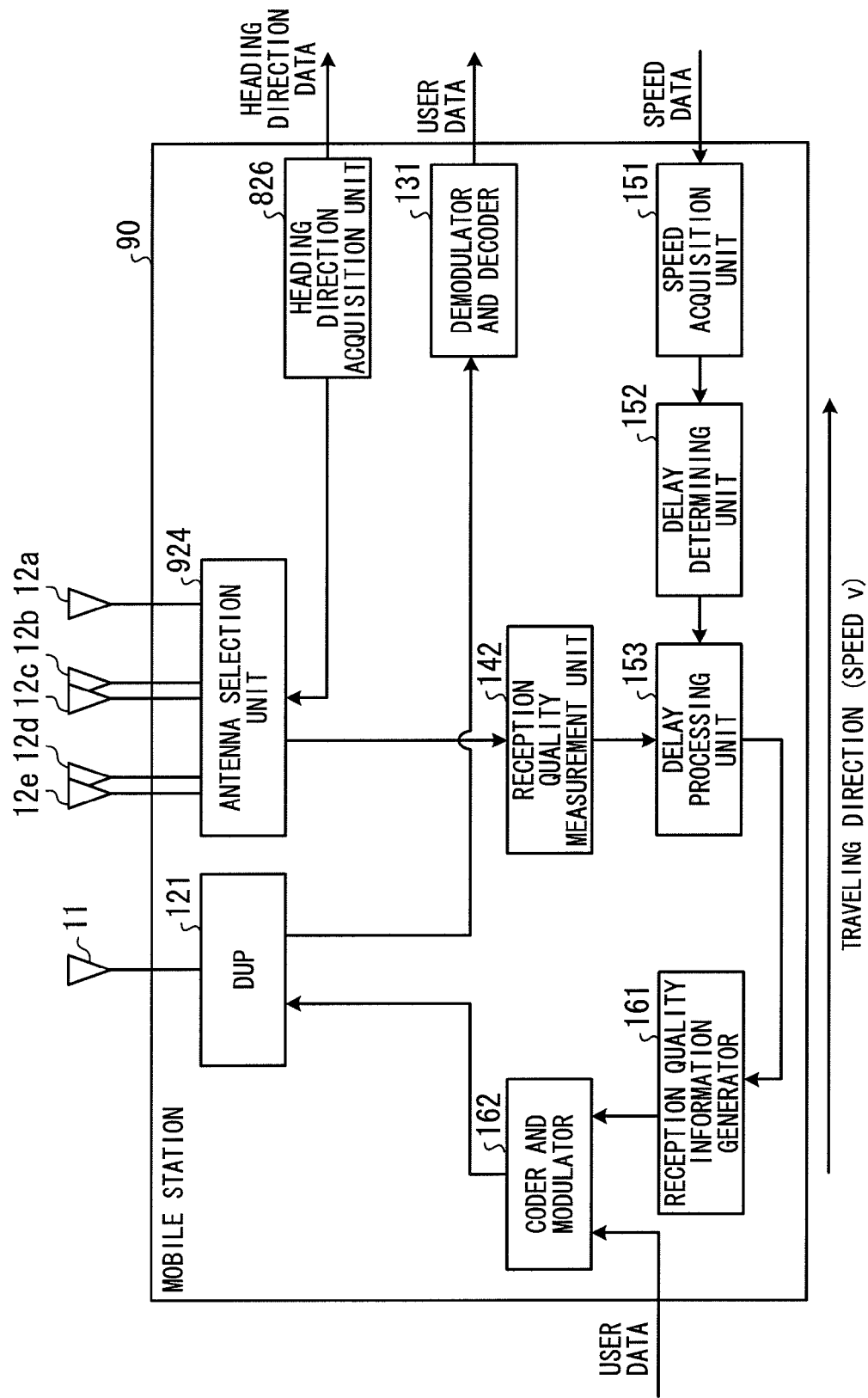
FIG. 15 is an example of a configuration of the mobile station of the ninth embodiment.

FIG. 15 is an example of a configuration of the mobile station 90 of the ninth embodiment. As illustrated in FIG. 15, the mobile station 90 is configured to include the antenna 11, the antennas 12a to 12e, an antenna selection unit 924, the traveling direction acquisition unit 826, the DUP 121, the demodulator and decoder 131, the reception quality measurement unit 142, the speed acquisition unit 151, the delay determining unit 152, the delay processing unit 153, the reception quality information generator 161, and the coder and modulator 162.

The antenna selection unit 924 uses information acquired by the traveling direction acquisition unit 826 as a basis to select any of the antennas 12a to 12e located closest to the traveling direction of the mobile station 90 viewed from the antenna 11. The antenna selection unit 924 then forwards a signal received by the selected antenna to the reception quality measurement unit 142. When the antennas 12a to 12e are located at various distances from the antenna 11, the antenna selection unit 924 notifies the delay determining unit 152 of the distance between the selected antenna and the antenna 11.

As described above, in the ninth embodiment, any of the antennas 12a to 12e may be selected in accordance with a change of the traveling direction. This accordingly enables the alignment of both the antenna to measure the reception quality and the antenna for data reception along the heading direction, and increases the accuracy of the adaptive modulation.

Tenth Embodiment

The ninth embodiment is an example of selecting any antenna after acquiring the traveling direction of the mobile station from the outside. Alternatively, such an antenna selection can be made without the mobile station being provided with data related to the traveling direction from the outside. In consideration thereof, in the tenth embodiment, a modified version of the mobile station 90 with which an antenna selection is made without the supply of data related to the traveling direction from the outside is described.

Figure 16:
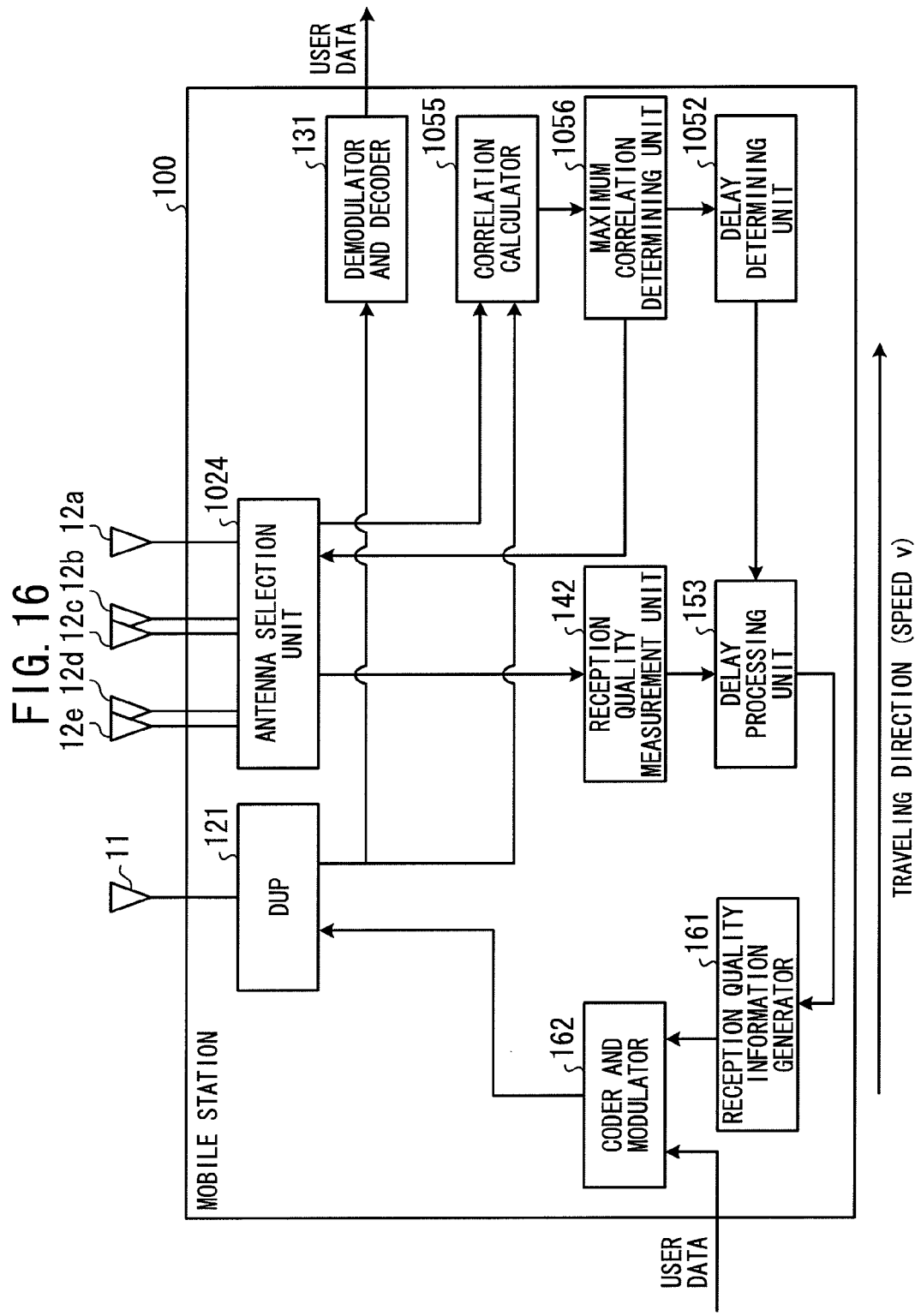
FIG. 16 is an example of a configuration of a mobile station of a tenth embodiment.

FIG. 16 is an example of a configuration of a mobile station 100 of the tenth embodiment. As illustrated in FIG. 16, the mobile station 100 is configured to include the antenna 11, the antennas 12a to 12e, an antenna selection unit 1024, the DUP 121, the demodulator and decoder 131, a correlation calculator 1055, a maximum correlation determining unit 1056, the reception quality measurement unit 142, a delay determining unit 1052, the delay processing unit 153, the reception quality information generator 161, and the coder and modulator 162.

The correlation calculator 1055 calculates the correlation between the intensity of the radio waves to be received by the antenna 11, and the intensity of the radio waves to be received by the antennas 12a to 12e. The correlation calculator 1055 uses a pilot signal or the like as a reference to measure the intensity of the radio waves to be received by the antenna 11, and the intensity of the radio waves to be received by the antennas 12a to 12e. The correlation calculator 1055 then calculates, in stages, with a shift of $\Delta t$ in stages in the time-axis direction, the temporal-change waveform of the correlation between the intensity of the radio waves received by the antenna 11, and the intensity of the radio waves received by the antenna 12a. The temporal-change waveforms here are those derived by measuring the intensity of such respective radio waves for a predetermined length of time. Also for the intensity of the radio waves to be received by each of the antennas 12a to 12e, the correlation calculator 1055 calculates, in stages, with a shift of $\Delta t$ in the time-axis direction, the correlation as a temporal-change waveform of the intensity of the radio waves to be received by the antenna 11.

The maximum correlation determining unit 1056 makes a comparison among the correlation results derived by the correlation calculator 1055, and determines which antenna shows the highest correlation value in which stage. The maximum correlation determining unit 1056 then acquires the cumulative value of $\Delta t$ at the stage showing the highest value of the correlation. The maximum correlation determining unit 1056 then notifies the antenna selection unit 1024 which of the antennas 12a to 12e shows the highest value of the correlation, and forwards the resulting cumulative value of $\Delta t$ at the stage of the highest value of the correlation to the delay determining unit 1052.

Figure 17:
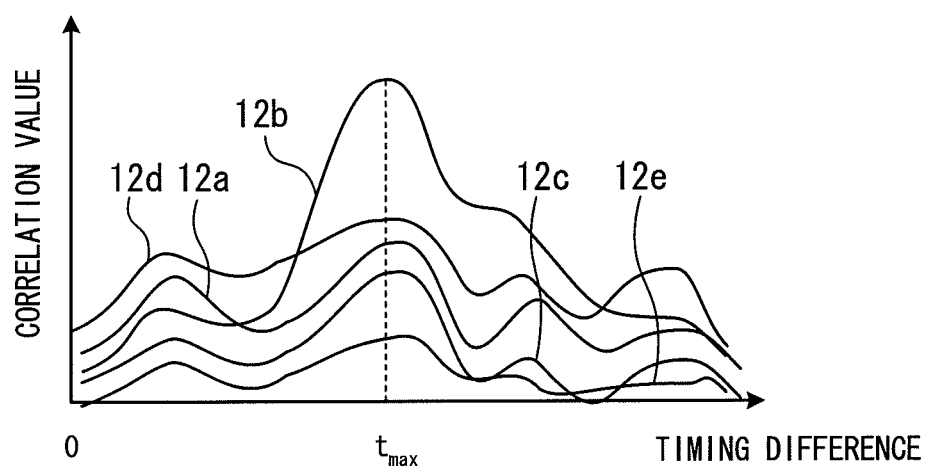
FIG. 17 is a diagram explaining, by a temporal-change waveform, an example of a correlation between the intensity levels of radio waves.
Figure 18:
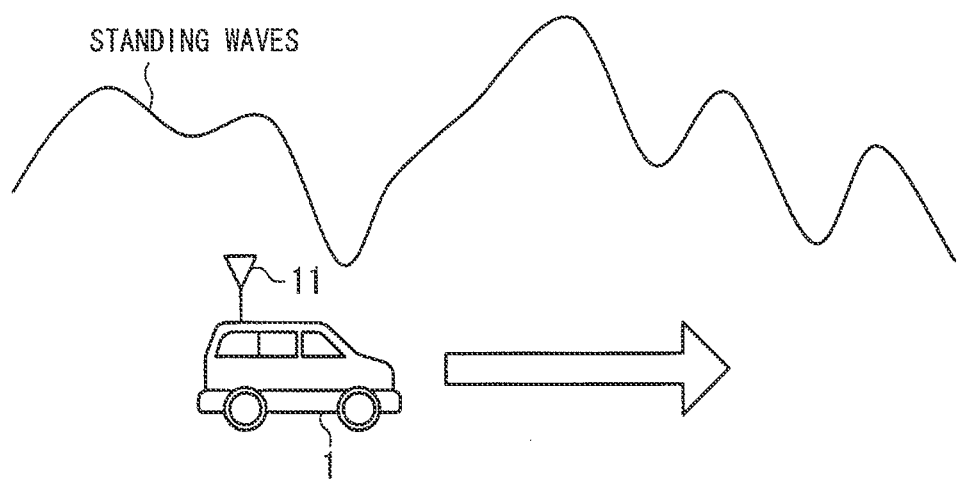
FIG. 18 is a diagram explaining an example of a fading environment.
Figure 19:
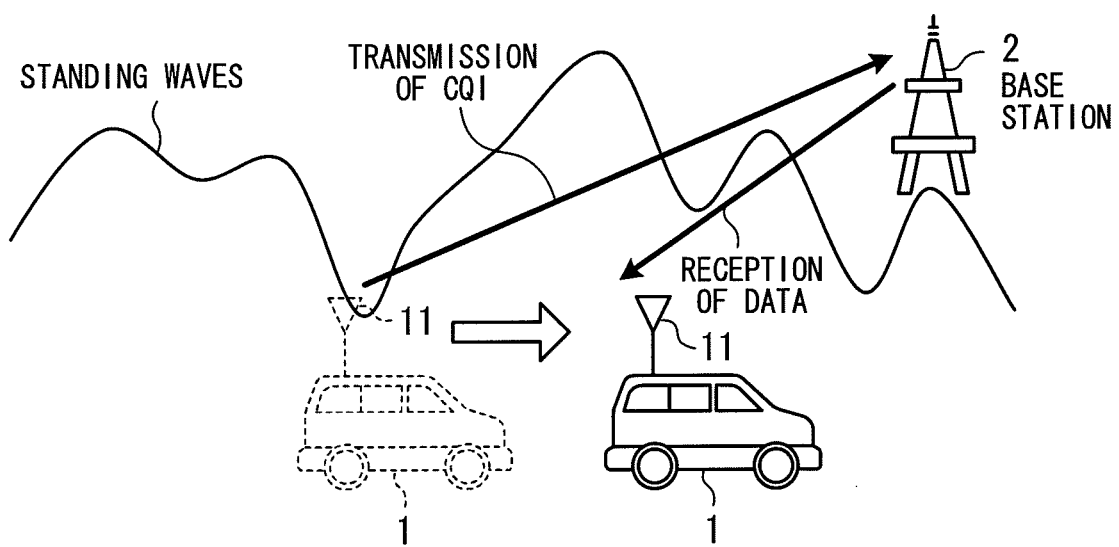
FIG. 19 is a diagram explaining the general outline of the adaptive modulation.

FIG. 17 illustrates an example of a correlation of a temporal-change waveform of the intensity of the radio waves. FIG. 17 illustrates an example of a correlation in the case of FIG. 14. At the timing difference tmax, the correlation with the antenna 12b shows the highest value. The timing difference tmax at the stage showing the highest value of the correlation corresponds to the cumulative value of Δt at this stage. In this embodiment, the maximum correlation determining unit 1056 forwards a signal corresponding to the antenna 12b to the antenna selection unit 1024, and outputs the timing difference tmax to the delay determining unit 1052.

The antenna selection unit 1024 selects any of the antennas 12a to 12e notified by the maximum correlation determining unit 1056. The antenna selection unit 1024 then outputs a signal received by the selected antenna to the reception quality measurement unit 142. Note here that when the distance varies among the antennas 12a to 12e and the antenna 11, the antenna selection unit 1024 notifies the delay determining unit 1052 of the distance between the selected antenna and the antenna 11.

The delay determining unit 1052 calculates the delay amount T using the equation 3 above, with the input of cumulative value of Δt, and the time D before data in any corresponding transmission format is provided after the reception quality information is transmitted to the base station 2. The delay determining unit 1052 then forwards the resulting delay amount T to the delay processing unit 153.

As described above, in the tenth embodiment, the correlation of intensity of the radio waves is used as a basis to select any of the antennas 12a to 12e. As such, without the supply of data related to the heading direction from the outside, the antenna located in the traveling direction is selected to measure the reception quality, thereby increasing the accuracy of the adaptive modulation.

For the mobile stations described in the embodiments above, numerous other modifications and variations may be devised without departing from the scope of the invention. As an example, the configurations of the mobile stations described in the embodiments above may be combined as appropriate to configure a mobile station.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. A mobile station comprising:
    a first antenna coupled to a duplicator for transmitting and receiving radio signals; and
    a second antenna provided a distance from the first antenna; and
    a processor coupled to the second antenna, the processor being configured to:
        measure, when the mobile station moves in a traveling direction from a location of the first antenna toward a location of the second antenna, a reception quality of the radio signal received from a base station via the second antenna;
        notify the base station of the measured reception quality;
        perform a reception process of a radio signal that is transmitted by the base station, which performs adaptive modulation control based on the reception quality notified by the processor, and is received via the first antenna;
        determine a first delay time based on a value derived by subtracting a time needed for exchanging information between the mobile station and the base station from a time needed for the mobile station to move in the traveling direction the distance between the first and second antennas;
        delay, by the determined first delay time, a first timing of notifying the base station of the measured reception quality;
        acquire a moving speed of the mobile station; and
        change the distance between the first and second antennas, while maintaining a direction from the first antenna to the second antenna, to make the first delay time equal to or larger than 0 and equal to or smaller than a threshold value in accordance with the moving speed of the mobile station.

2. The mobile station according to claim 1, wherein the notification is made with a delay in accordance with a timing of performing the adaptive modulation control.

3. The mobile station according to claim 1, wherein, due to the movement of the mobile station, the reception process is performed when the first antenna is located in an area where the second antenna was located when the reception quality was measured.

4. The mobile station according to claim 1, wherein the processor is configured to,
    based on the acquired moving speed and the distance between the first and second antennas, calculate a time needed for the mobile station to move in the traveling direction the distance between the first and second antennas.

5. The mobile station according to claim 1, further comprising:
    a third antenna disposed at a location a predetermined distance away from the second antenna in the traveling direction of a wireless communications terminal device, wherein
    the processor is configured to:
        measure a reception quality of the third antenna;
        determine a second delay time based on a time derived by subtracting a time needed for exchanging information between the wireless communications terminal device and the base station from a time for the first antenna to reach the location of the third antenna when the wireless communications terminal device is moved; and
        delay a second timing of notifying the base station of the reception quality of the third antenna by the determined second delay time, combining the reception quality of the third antenna with the delayed first notification timing, together with the reception quality of the third antenna with the delayed second notification timing, and notifies the base station of a combination result.

6. The mobile station according to claim 5, wherein the processor combines the reception quality of the third antenna with the delayed first notification timing together with the measured reception quality without a delayed notification timing, and notifies the base station of the combination result.

7. The mobile station according to claim 1, wherein the processor is configured to:
    measure a reception quality of the first antenna;
    delay a second timing of notifying the base station of the reception quality of the first antenna by the first delay time; and
    combine the reception quality of the first antenna with the delayed first notification timing, the measured reception quality without a delayed notification timing, the reception quality of the first antenna with the delayed second notification timing, and the reception quality of the first antenna without the delayed notification timing, and notifies the base station of a combination result.

8. The mobile station according to claim 1, wherein the processor is configured to:
measure a reception quality of the first antenna; and
based on a correlation between the measured reception quality and the reception quality of the first antenna, calculate a time needed for the mobile station to move the distance between the first and second antennas in the traveling direction.

9. The mobile station according to claim 1, wherein the processor is configured to select, as the second antenna, any of a plurality of antennas with the first delay time equal to or larger than 0 and smaller than delay times of other antennas.

10. The mobile station according to claim 1, wherein the processor is configured to rotate the first and second antennas to make the second antenna be located in front of the first antenna in the traveling direction of the mobile station.

11. The mobile station according to claim 1, wherein the processor is configured to select, as the second antenna, any of a plurality of antennas closest to a traveling direction of the mobile station viewed from the first antenna.

12. The mobile station according to claim 1, wherein the processor is configured to select, as the second antenna, any of a plurality of antennas with a highest correlation of the reception quality with the first antenna.

13. A base station, comprising:
a receiver configured to receive a notification of a reception quality from a mobile station, which includes first and second antennas with a distance therebetween and moves in a traveling direction from a location of the first antenna toward a location of the second antenna, the reception quality being measured by the mobile station on a radio signal that is transmitted by the base station and received by the mobile station via the second antenna;
a processor configured to perform adaptive modulation control on a transmission signal based on the reception quality; and
a transmitter configured to transmit the transmission signal in accordance with the adaptive modulation control to allow reception thereof by the mobile station via the first antenna, wherein
the first antenna is coupled to a duplicator for transmitting and receiving radio signals;
the second antenna is coupled to a processor for processing a radio signal received via the second antenna; and
the mobile station comprises a processor configured to:
determine a delay time based on a value derived by subtracting a time needed for exchanging information between the mobile station and the base station from a time needed for the mobile station to move in the traveling direction the distance between the first and second antennas;
delay, by the determined delay time, a timing of notifying the base station of the measured reception quality;
acquire a moving speed of the mobile station; and
change the distance between the first and second antennas, while maintaining a direction from the first antenna to the second antenna, to make the delay time equal to or larger than 0 and equal to or smaller than a threshold value in accordance with the moving speed of the mobile station.

14. A method of a mobile station provided with a first antenna and a second antenna with a distance therebetween for adjusting to movement of the mobile station, the method comprising:
measuring, when the mobile station moves in a direction from a location of the first antenna toward a location of the second antenna, a reception quality of a radio signal received from a base station via the second antenna;
notifying the base station of the reception quality measured by the reception quality measurement unit;
performing a reception process of a radio signal that is transmitted by the base station, which performs adaptive modulation control based on the reception quality notified by the notification unit, and is received via the first antenna;
determining a delay time based on a value derived by subtracting a time needed for exchanging information between the mobile station and the base station from a time needed for the mobile station to move in the traveling direction the distance between the first and second antennas;
delaying, by the determined delay time, a timing of notifying the base station of the measured reception quality;
acquiring a moving speed of the mobile station; and
changing the distance between the first and second antennas, while maintaining a direction from the first antenna, to the second antenna, to make the delay time equal to or larger than 0 and equal to or smaller than a threshold value in accordance with the moving speed of the mobile station, wherein
the first antenna is coupled to a duplicator for transmitting and receiving radio signals; and
the second antenna is coupled to a processor for processing a radio signal received via the second antenna.

15. A method of a base station communicating with a mobile station that includes first and second antennas with a distance therebetween and that moves in a direction from a location of the first antenna toward a location of the second antenna, the method comprising:
receiving a notification of a reception quality from the mobile station, the reception quality being measured by the mobile station on a radio signal that is transmitted by the base station and received by the mobile station via the second antenna;
performing adaptive modulation control on a transmission signal based on the reception quality; and
transmitting the transmission signal in accordance with the adaptive modulation control to allow reception thereof by the mobile station via the first antenna, wherein
the first antenna is coupled to a duplicator for transmitting and receiving radio signals;
the second antenna is coupled to a processor for processing a radio signal received via the second antenna; and
the mobile station is configured to:
determine a delay time based on a value derived by subtracting a time needed for exchanging information between the mobile station and the base station from a time needed for the mobile station to move in the traveling direction the distance between the first and second antennas;
delay, by the determined delay time, a timing of notifying the base station of the measured reception quality;
acquire a moving speed of the mobile station; and
change the distance between the first and second antennas, while maintaining a direction from the first antenna to the second antenna, to make the delay time equal to or larger than 0 and equal to or smaller than a threshold value in accordance with the moving speed of the mobile station.

\* \* \* \* \*